United States Patent
Yeh et al.

(10) Patent No.: US 11,431,444 B2
(45) Date of Patent: Aug. 30, 2022

(54) COMMUNICATION METHOD AND SYSTEM FOR JOINT DOWNLINK AND UPLINK TRANSMISSIONS

(71) Applicant: Intel Corporation, Santa Clara, CA (US)

(72) Inventors: Shu-Ping Yeh, Campbell, CA (US); Ping Wang, San Jose, CA (US); Alexander W. Min, Portland, OR (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 584 days.

(21) Appl. No.: 16/328,369

(22) PCT Filed: Sep. 29, 2016

(86) PCT No.: PCT/US2016/054419
§ 371 (c)(1),
(2) Date: Feb. 26, 2019

(87) PCT Pub. No.: WO2018/063239
PCT Pub. Date: Apr. 5, 2018

(65) Prior Publication Data
US 2021/0281364 A1    Sep. 9, 2021

(51) Int. Cl.
*H04L 1/16* (2006.01)
*H04L 1/18* (2006.01)
*H04L 1/20* (2006.01)

(52) U.S. Cl.
CPC .......... *H04L 1/1685* (2013.01); *H04L 1/1614* (2013.01); *H04L 1/1635* (2013.01); *H04L 1/1825* (2013.01); *H04L 1/1854* (2013.01); *H04L 1/1896* (2013.01); *H04L 1/20* (2013.01)

(58) Field of Classification Search
CPC ....... H04L 1/1685; H04L 1/20; H04L 1/1825; H04L 1/1854; H04L 1/1614; H04L 1/1896; H04L 1/1635
See application file for complete search history.

(56) References Cited

U.S. PATENT DOCUMENTS

| | | | |
|---|---|---|---|
| 6,301,289 B1* | 10/2001 | Bejjani | H04W 56/0005 375/144 |
| 9,231,737 B1* | 1/2016 | Feng | H04L 1/1692 |
| 2002/0118654 A1 | 8/2002 | Chang et al. | |
| 2005/0129101 A1* | 6/2005 | Stephens | H04L 1/16 375/222 |
| 2007/0153754 A1* | 7/2007 | Shapira | H04W 16/10 370/338 |

(Continued)

OTHER PUBLICATIONS

PCT International Searching Authority, PCT Search Report issued for PCT/US2016/054419, 2 pgs., dated Dec. 9, 2016.

*Primary Examiner* — Ivan O Latorre
(74) *Attorney, Agent, or Firm* — Banner & Witcoff Ltd.

(57) ABSTRACT

In a communication method to communicate between an access point (AP) and first and second communication stations (STAs) can include calculating joint transmission information based on the first and the second STAs, establishing an uplink communication between the AP and the first STA; and establishing a downlink communication between the AP and the second STA jointly with the uplink communication between the AP and the first STA based on the joint transmission information.

26 Claims, 11 Drawing Sheets

(56) References Cited

U.S. PATENT DOCUMENTS

| | | | |
|---|---|---|---|
| 2008/0144564 A1 | 6/2008 | Hamalianen et al. | |
| 2009/0135748 A1* | 5/2009 | Lindoff | H04W 72/048 370/296 |
| 2009/0238066 A1 | 9/2009 | Cheng | |
| 2010/0027484 A1* | 2/2010 | Imamura | H04W 72/042 370/329 |
| 2013/0016661 A1* | 1/2013 | Liu | H04W 28/04 370/328 |
| 2013/0229996 A1* | 9/2013 | Wang | H04L 1/1685 370/329 |
| 2013/0301484 A1* | 11/2013 | Khandani | H04L 1/1896 370/277 |
| 2013/0343235 A1 | 12/2013 | Khan | |
| 2014/0269541 A1* | 9/2014 | Khude | H04W 72/042 370/329 |
| 2014/0294110 A1* | 10/2014 | Cheong | H04B 7/0452 375/267 |
| 2015/0036673 A1* | 2/2015 | Asterjadhi | H04W 28/065 370/338 |
| 2015/0109998 A1* | 4/2015 | Yang | H04L 1/1896 370/328 |
| 2015/0131751 A1* | 5/2015 | Bayesteh | H04B 7/0482 375/267 |
| 2015/0381335 A1* | 12/2015 | Khojastepour | H04B 7/0421 370/278 |
| 2016/0081106 A1* | 3/2016 | Zhou | H04W 28/26 370/328 |
| 2016/0113034 A1* | 4/2016 | Seok | H04W 74/04 370/329 |
| 2016/0165541 A1* | 6/2016 | Camp, Jr | H04W 72/1278 370/311 |
| 2016/0234802 A1* | 8/2016 | Yang | H04W 56/0035 |
| 2017/0149547 A1* | 5/2017 | Kim | H04B 7/2678 |
| 2017/0230164 A1* | 8/2017 | Zhang | H04L 5/0023 |
| 2018/0020476 A1* | 1/2018 | Aijaz | H04L 69/28 |
| 2019/0075581 A1* | 3/2019 | Salem | H04W 74/006 |
| 2020/0107356 A1* | 4/2020 | Rico Alvarino | H04W 72/1284 |

* cited by examiner

COMMUNICATION METHOD AND SYSTEM FOR JOINT DOWNLINK AND UPLINK TRANSMISSIONS

BACKGROUND

Field

Aspects described herein generally relate to joint download and upload transmissions, including half-duplex and full-duplex environments.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIGS. 9A to 12 illustrate source-based joint DL-UL transmission operations according to exemplary aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
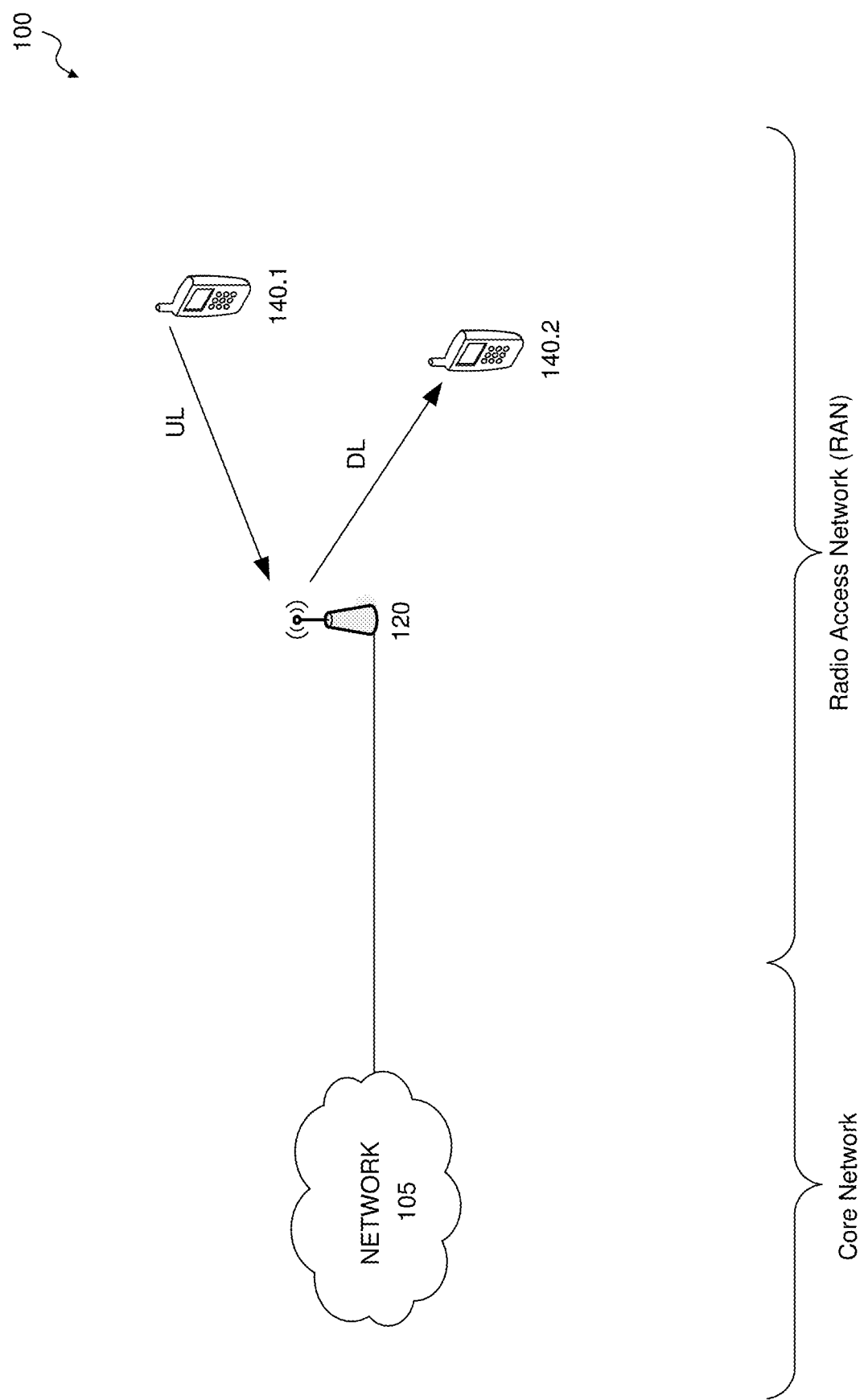
FIG. 1 illustrates an example communication environment.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, advancements in self-interference cancellation has enabled wireless devices to communicate in full-duplex (FD)—to transmit and receive simultaneously at the same frequency band. Due to strong transmission (Tx) echo, wireless devices can transmit and receive over orthogonal frequency/time resource. Advances in echo cancellation can now successfully suppress Tx echo, including by more than 120 dB, which allows wireless devices to decode received data even when the same frequency/time resource is used for transmission. Although the FD transmission capability can potentially double-up data throughput, it requires extensive media access control (MAC) protocol designs to maximize FD gain.

In exemplary aspects, the WiFi MAC protocol is configured to take advantage of FD capable devices, including in scenarios where a FD-capable WiFi access point (AP) communicates with legacy half-duplex (HD) WiFi stations (STAs) and/or where a HD WiFi AP communicates with a FD capable STA. For the sake of brevity, exemplary aspect will be described for FD-capable APs communicating with HD-capable STAs, but are not limited thereto and can also apply to FD-capable STAs communicating with HD-capable APs and/or HD-capable STAs, ad-hoc networks (e.g., STA to STA communications), relay networks such as WiFi Direct systems (e.g., AP communicates with an FD-STA, which forwards communications to another STA), and/or other configurations as would be understood by one of ordinary skill in the relevant arts.

In exemplary aspects, AP FD capability is exploited through simultaneous joint downlink (DL) and uplink (UL) transmission with a pair of STAs that include a DL STA and an UL STA, including procedures and triggering criteria to enable such joint DL-UL transmissions.

Further, in exemplary aspects, communication methods enable a FD AP to jointly schedule DL and UL transmission of half-duplex WiFi STAs without requiring WiFi standard changes and/or require the AP to be capable of pre-decoding a MAC-header before receiving the entire packet (e.g., before receiving frame check sequence (FCS)).

As described herein, the communication methods can include when the AP wins the channel contention (source-based) and when the STA wins the channel contention (destination-based). Further, exemplary criteria to trigger joint DL-UL transmission procedures to increase joint DL-UL transmission probability are described.

For the purpose of this discussion, a source-based joint DL-UL transmission is when the AP wins the contention of channel access for DL transmission and triggers/polls another STA for FD-UL transmission. A destination-based joint DL-UL transmission is when the STA wins the contention of channel access for UL transmission and AP initiates a FD-DL transmission afterwards.

Exemplary aspects can include, for example: the utilization of block acknowledgement (ACK) to time-division multiplex (TDM) DL and UL ACK, which can enable a UL STA with a weaker link to the AP to transmit together with another DL transmission and avoid the general need to have the signal from the AP to the UL STA be sufficiently strong enough to combat DL STA to UL STA interference; the transmission of the FD-DL with a timing advance to protect the FD-DL preamble; and transmission of the UL in aggregated MAC protocol data unit (A-MPDU) and the trigger of the FD-DL transmission by the AP after detecting the first MPDU.

The present disclosure is directed to transmission procedures and pairing criteria for joint DL-UL transmission for various types of WiFi STAs, including: non-quality of service (non-QoS) STA (i.e., legacy STAs capable of Institute of Electrical and Electronics Engineers' (IEEE) 802.11a/b/g); QoS STAs (STAs that also include functions set forth in IEEE 802.11e); and high throughput (HT) STAs (i.e., STAs that also include IEEE 802.11n or more advanced 802.11 capabilities). The present disclosure is not limited to these example types of STAs and can be other types of STAs having different wireless capabilities as would be understood by one of ordinary skill in the relevant arts.

The capability of WiFi STAs are defined as follows:

Non-QoS STA: The STA cannot support 802.11e but can support the 802.11a, 802.11b and/or 802.11g standard.

QoS STA: In addition to 802.11a, 802.11b and/or 802.11g, the STA can also support the 802.11e standard.

High throughput (HT) STA: In addition to 802.11a, 802.11b and/or 802.11g, the STA can also support 802.11n and 802.11e standard. The HT STA is also a QoS STA. In one or exemplary aspects, a HT STA can also support more advanced 802.11 standard(s), such as the 802.11ac.

Exemplary aspects can include:

Block Acknowledgment (ACK) (BlockACK) for FD-DL transmission of QoS STAs to avoid Acknowledgement (ACK) collision.

Trigger FD-DL transmission after decoding first UL A-MPDU sub-frame of UL A-MPDU for UL QoS STA.

Start FD-DL transmission before (e.g., several microseconds) expected FD-UL transmission to improve FD-DL preamble detection success rate.

Adopt Hybrid coordination function (HCF) controlled channel access (HCCA) for QoS STA to enable source-based joint DL-UL transmission.

Adopt Point coordination function (PCF) for non-QoS CF-pollable STA to enable source-based joint DL-UL transmission.

FIG. 1 illustrates an example communication environment 100 that includes a radio access network (RAN) and a core network. The RAN includes a wireless access point (AP) 120 and two or more wireless stations (STAs) 140. The core network includes backhaul communication network 105 that is communicatively coupled to the AP 120. The backhaul communication network 105 can include one or more well-known communication components—such as one or more network switches, one or more network gateways, and/or one or more servers. The backhaul communication network 105 can include one or more devices and/or components configured to exchange data with one or more other devices and/or components via one or more wired and/or wireless communications protocols. In exemplary aspects, the AP 120 communicates with one or more service providers and/or one or more other APs 120 via the backhaul communication network 105. In an exemplary aspect, the backhaul communication network 105 is an internet protocol (IP) backhaul network.

In an exemplary aspect, the AP 120 can support one or more wireless communication protocols including, for example, wireless local access networks (WLAN) conforming to Institute of Electrical and Electronics Engineers' (IEEE) 802.11 Wi-Fi specification. In this example, the AP 120 can be referred to as a WLAN or WiFi Access Point (AP).

The AP 120 and STAs 140 are not limited to IEEE 802.11 protocols, and the AP 120 and STA 140 can support one or more other protocols in addition to (or in the alternative to) the IEEE 802.11 standards described herein as would be understood by one of ordinary skill in the relevant arts. Further, the number of APs 120, mobile devices 140, and/or networks 105 are not limited to the exemplary quantities illustrated in FIG. 1, and the communication environment 100 can include any number of the various components as would be understood by one of ordinary skill in the relevant art(s).

In operation, the STA 140 can be configured to wirelessly communicate with the AP 120. For example, the STA 140 receives signals on one or more downlink (DL) channels and transmits signals to the AP 120 on one or more respective uplink (UL) channels. As illustrated in FIG. 1, in an exemplary aspect, the AP 120 is a full-duplex (FD) capable AP and the STAs 140 are half-duplex (HD) capable STAs, where the FD AP 120 is configured to jointly schedule DL and UL transmission with HD STAs 140. Although examples are described that include a FD AP to HD STA relationship, it should be appreciated that the converse is also considered in the present disclosure, where the AP 120 is a HD AP while the STAs 140 are FD STAs.

In an exemplary aspect, the AP 120 and/or STAs 140 includes processor circuitry that is configured to control the corresponding device to communicate via one or more wireless technologies. The AP 120 and the STAs 140 can be configured to support HD and/or FD transmissions. The STAs 140 and the AP 120 can each include one or more transceivers configured to transmit and/or receive wireless communications via one or more wireless technologies within the communication environment 100.

Examples of the STA 140 include (but are not limited to) a mobile computing device—such as a laptop computer, a tablet computer, a mobile telephone or smartphone, a "phablet," a personal digital assistant (PDA), and mobile media player; an internet of things (IOT) device, and a wearable computing device—such as a computerized wrist watch or "smart" watch, and computerized eyeglasses. In one or more aspects of the present disclosure, the STA 140 may be a stationary device, including, for example, a stationary computing device—such as a personal computer (PC), a desktop computer, a computerized kiosk, and an automotive/aeronautical/maritime in-dash computer terminal, and/or a smart device/appliance—such as, for example, smart lighting device, smart door lock, smart home security system, smart refrigerator, etc.

Figure 2:
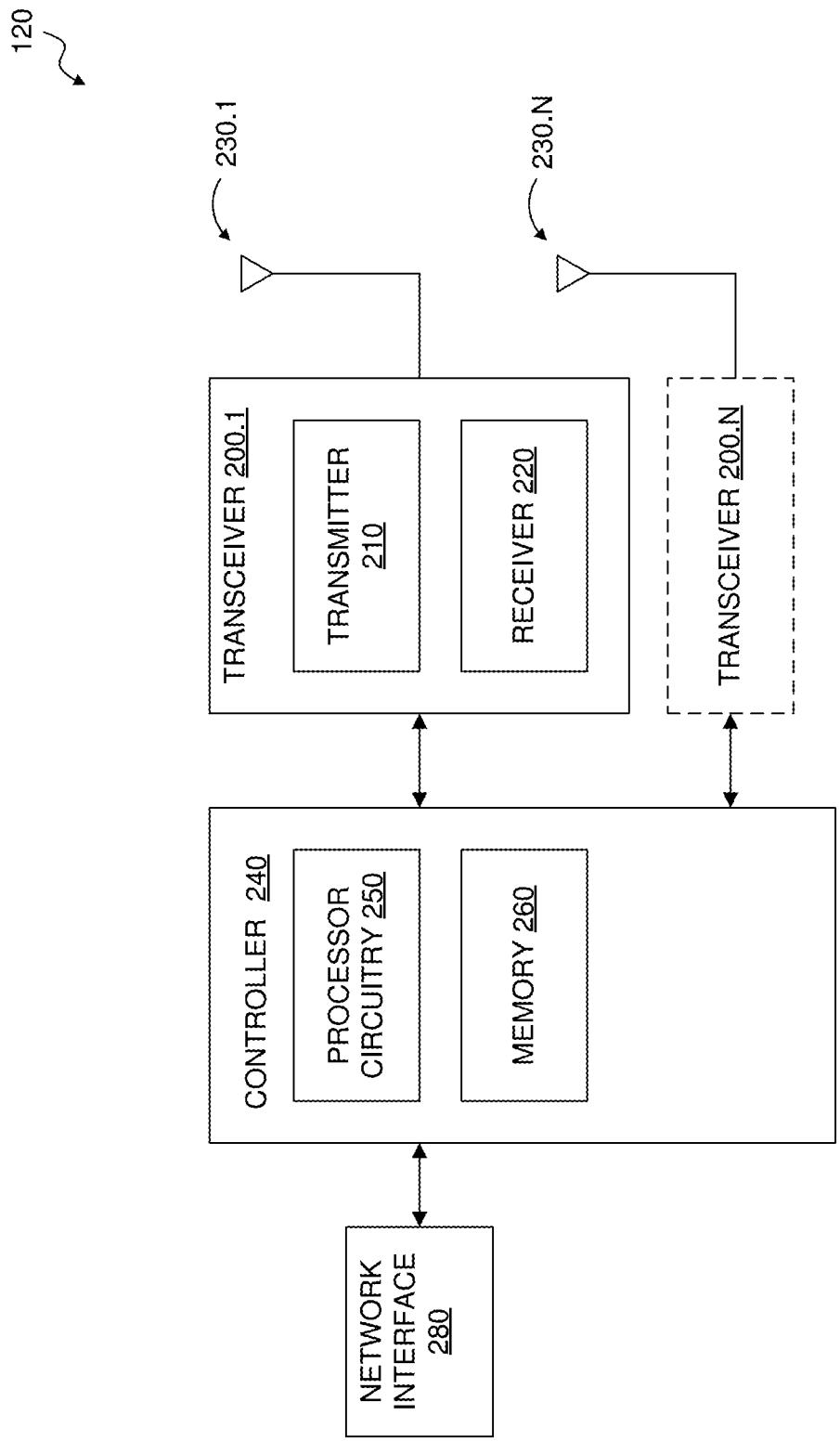
FIG. 2 illustrates an access point (AP) according to an exemplary aspect of the present disclosure.

FIG. 2 illustrates an exemplary aspect of the access point (AP) 120. For example, the AP 120 can include one or more transceivers 200 and a network interface 280, each communicatively coupled to controller 240. In an exemplary aspect, the AP 120 is a FD-capable WiFi AP configured to jointly communicate with two or more half-duplex (HD) WiFi stations (STAs) such as STAs 140. For example, the FD AP 120 is configured to perform concurrent/simultaneous joint downlink (DL) and uplink (UL) transmission with a pair of STAs 140, where one STA 140 is a DL STA and another STA 140 is an UL STA. The AP 120 is configured to jointly schedule DL and UL transmission of half-duplex WiFi STAs 140 without requiring WiFi standard changes and/or pre-decoding a MAC-header before receiving the entire packet (e.g., before receiving frame check sequence (FCS)).

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. In an exemplary For example, the transceiver 200 can include a transmitter 210 and receiver 220 that are configured for transmitting and receiving IEEE 802.11 communications via one or more antennas 235.

In an exemplary aspect, the transceiver 200 can be configured to support one or more wireless communication protocols including, for example, wireless local access networks (WLAN) conforming to the IEEE 802.11 Wi-Fi specification. One of ordinary skill in the relevant art(s) will understand that the transceiver 200 is not limited to IEEE 802.11 communications, and can be configured for communications that conform to one or more other protocols in addition (or in the alternative) to the IEEE 802.11 communications. In exemplary aspects where the AP 120 includes two or more transceivers 200, the transceivers 200 can be configured to communicate using the same or different communication protocols/standards.

Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the AP 120 can be configured for wireless communication utilizing a Multiple-input Multiple-output (MIMO) configuration.

The network interface 280 includes processor circuitry that is configured to transmit and/or receive communications via one or more wired technologies to/from the backhaul communication network 105. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the AP 120, and/or one or more components of the AP 120 such as the transceiver 200 and/or network interface 280. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.); and/or to the operation of the network interface 280 including, for example, transmitting and/or receiving of wired and/or wireless communications via the network interface 280, and/or perform one or more baseband processing functions (e.g., media access control (MAC), encoding/decoding, modulation/demodulation, data symbol mapping, error correction, etc.).

The controller 240 can further include a memory 260 that stores data and/or instructions, where when the instructions are executed by the processor circuitry 250, controls the processor circuitry 250 to perform the functions described herein. In an exemplary aspect, the memory 260 stores (SINR), time alignment and/or efficiency criteria. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

As described in more detail below, in exemplary aspects, the controller 240 is configured to perform FD-capable communications. The controller 240 can be configured to control the AP 120 to communicate with two or more HD WiFi STAs such as STAs 140. In an exemplary aspect, the controller 240 is configured to perform simultaneous joint DL and UL transmission via the transceiver 200 with a pair of STAs 140, where one STA 140 is a DL STA and another STA 140 is an UL STA. The controller 240 is configured to jointly schedule DL and UL transmission of half-duplex WiFi STAs 140 without requiring WiFi standard changes and/or pre-decoding a MAC-header before receiving the entire packet (e.g., before receiving frame check sequence (FCS)). Operations of the controller 240 according to exemplary aspects are described with reference to FIGS. 4A-12 below.

Figure 3:
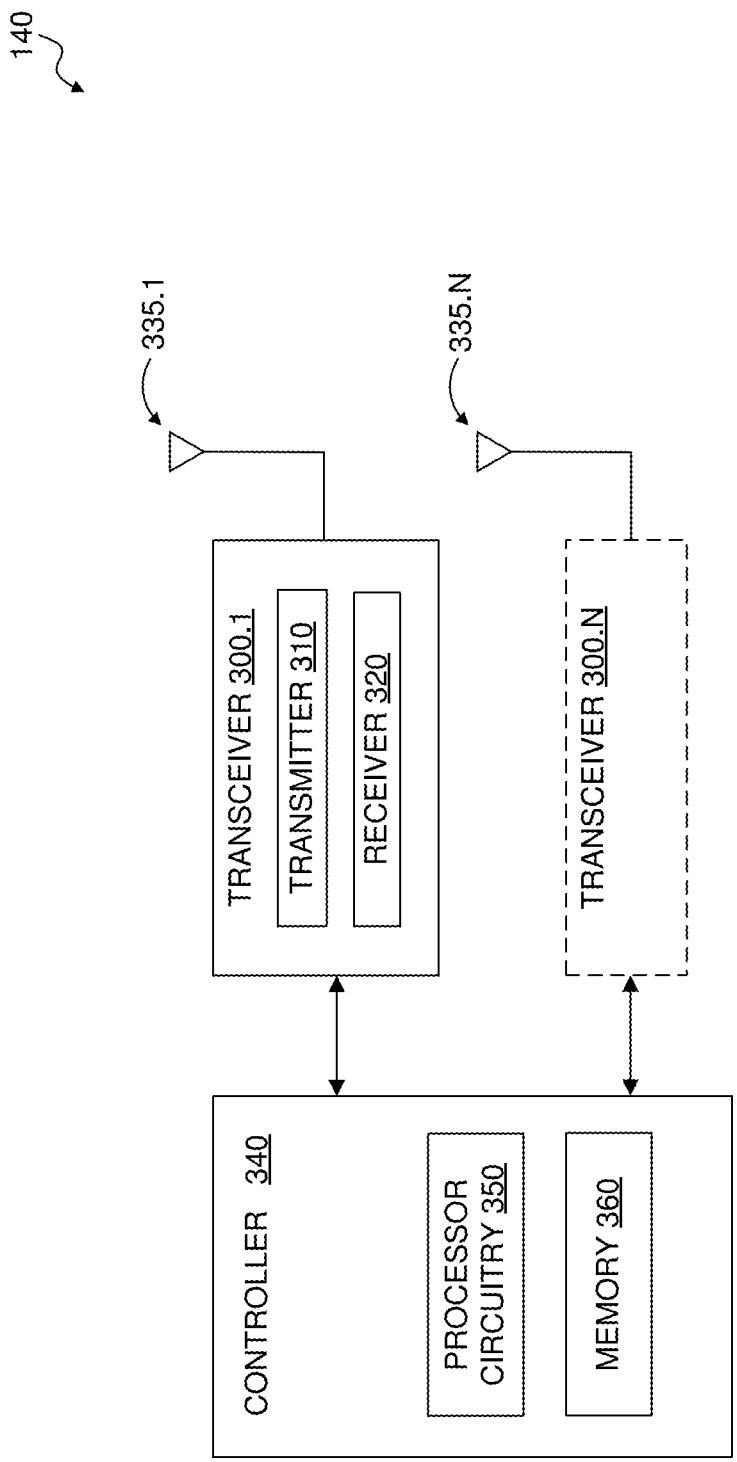
FIG. 3 illustrates a communication station (STA) according to an exemplary aspect of the present disclosure.

FIG. 3 illustrates an exemplary aspect of a STA 140. The STA 140 can include controller 340 communicatively coupled to one or more transceivers 300 configured to transmit and/or receive wireless communications via one or more wireless technologies within the communication environment 100.

The transceiver(s) 300 can each include processor circuitry that is configured for transmitting and/or receiving wireless communications conforming to one or more wireless protocols. For example, the transceiver 300 can include a transmitter 310 and receiver 320 that are configured for transmitting and receiving IEEE 802.11 communications via one or more antennas 335.

The transceiver 300 can include a transmitter 310 and receiver 320 that are configured for transmitting and receiving IEEE 802.11 communications, respectively, via one or more antennas 335. In this example, the transceiver 300 can be referred to as WLAN or Wi-Fi transceiver 300. Those skilled in the relevant art(s) will understand that the transceiver 300 is not limited to WLAN communications, and can be configured for communications that conform to one or more other protocols in addition (or in the alternative) to the IEEE 802.11 communications.

In exemplary aspects, the transceiver(s) 300 can each include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The controller 340 can include processor circuitry 350 that is configured to control the overall operation of the STA 140, such as the operation of the transceiver 300—including, for example, transmitting and/or receiving of wireless communications via the transceivers 300, perform one or more baseband processing functions (e.g., media access control (MAC), encoding/decoding, modulation/demodulation, data symbol mapping, error correction, etc.); perform one or more interference estimations; the running of one or more applications and/or operating systems; power management (e.g., battery control and monitoring); display settings; volume control; and/or user interactions via one or more user interfaces (e.g., keyboard, touchscreen display, microphone, speaker, etc.).

The controller 340 can further include a memory 360 that stores data and/or instructions, where when the instructions are executed by the processor circuitry 350, controls the processor circuitry 350 to perform the functions described herein. In an exemplary aspect, the memory 360 can store (SINR), time alignment and/or efficiency criteria. The memory 360 can be any well-known volatile and/or non-volatile memory, and can be non-removable, removable, or a combination of both.

In an exemplary aspect, the STA 140 is a HD capable STA, and the processor circuitry 350 is configured to control the STA 140 to communication with a FD capable AP 120. Although exemplary aspects are discussed for HD STA and FD AP configurations, the STA 140 can be configured for the converse operation (FD STA and HD AP/STA) when the STA is a FD STA communicating with a HD AP and/or a HD STA. The STA 140 can be one of a pair of STAs simultaneously communicating with the AP 120, where one STA 140 is a DL STA and another STA 140 is an UL STA.

Destination-based joint DL-UL transmission operations and source-based joint DL-UL transmission operations are described with reference to FIGS. 4A to 12. In particular, destination-based joint DL-UL transmission operations are described with reference to FIGS. 4A to 8, while source-based joint DL-UL transmission operations are described with reference to FIGS. 9A to 12.

Exemplary aspects of both destination-based joint DL-UL transmission operations and source-based joint DL-UL transmission operations include Signal-to-interference-plus-noise ratio (SINR), time alignment and/or efficiency criteria to trigger joint DL-UL transmissions. In exemplary aspects, the operations can include BlockACK for FD-DL transmission to avoid ACK collision and/or using A-MPDU to enhance joint DL-UL transmission opportunities. In exemplary aspects where transmission procedures allow for FD-DL to start earlier than FD-UL, the FD-DL start time can be offset to protect preamble detection.

In one or more exemplary aspects, it can be assumed that a list of pair-able DL STAs for an UL STA and the corresponding FD-DL data rate are available at the AP. Procedures to identify pair-able DL-STA and UL-STA can include, for example, using past joint transmission success rates, sending test-purpose measurement packets, and/or one or more other operations as would be understood by one of ordinary skill in the art.

Example Destination-Based Joint DL-UL Transmission Operations

As described above, in destination-based joint DL-UL transmission, the STA wins the channel contention process and sends packet(s) to AP first. Upon detecting UL data from the STA, the FD-capable AP can send a DL packet to a pair-able DL STA.

In a destination-based joint DL-UL transmission operation in which the STA 140 transmits data directly without utilizing Request-to-Send (RTS)/Clear-to-send (CTS) protocols, the DL transmission can be triggered after the AP 120 successfully decodes the Destination Address (DA) field of the MAC header. In this example, the AP 120 may only trigger the FD-DL transmission after confirming the AP 120 is the targeted recipient of UL data (e.g., using the decoded DA field).

In an exemplary aspect, if the DL STA 120 can detect the PHY preamble of the UL transmission, the DL STA 140 will lock to the UL transmission and will not decode DL data from the AP 120. In exemplary aspects of the present disclosure, one or more of the following conditions are satisfied:

1. A link from the UL STA to the DL STA is sufficiently weak that the DL STA is unable to detect the UL preamble.
2. The DL STA is configured to attempt to sync with another transmit signal after detecting that the recipient of current UL transmissions is not itself. In this case, the SINR requirement when the signal arrives after interference will be higher.
3. The hardware for the DL STA is configured to detect the preamble of another transmission while receiving a packet. If the other transmission is stronger, the DL can sync to the new transmission and abort the previous reception process. In this example, the SINR requirement for preamble detection may be high.

In exemplary aspects, the AP 120 can be configured to schedule DL STAs 140 satisfying one of the above three conditions for FD-DL transmission.

In an exemplary aspect, the destination-based joint DL-UL transmission operations and source-based joint DL-UL transmission operations include Signal-to-interference-plus-noise ratio (SINR), time alignment and/or efficiency criteria to trigger joint DL-UL transmissions. For the purpose of this disclosure, each of these criteria are referred to as the baseline criteria for the corresponding type.

For example, various SINR conditions to trigger joint DL-UL transmission are shown below in Equations 1(a) to 1(e):

a. For UL MAC header detection: $\dfrac{S_{UL \to AP}}{N} \geq TH_{MCSx_{UL}, no\ FCS}$ b. For UL data: $\dfrac{S_{UL \to AP}}{I_{Echo} + N} \geq TH_{MCSx_{UL}}$ c. For DL preamble: $\dfrac{S_{AP \to DL}}{I_{UL \to DL} + N} \geq TH_{PreambleCapture}$ d. For DL data: $\dfrac{S_{AP \to DL}}{I_{UL \to DL} + N} \geq TH_{MCSx_{DL}}$ e. For UL ACK reception: $\dfrac{S_{AP \to UL}}{I_{DL \to UL} + N} \geq TH_{MCS0}$.

Where:
$S_{UL \to AP}$: Signal strength from UL STA to AP. Same notation applies for other cases with different sender and receiver.
$S_{AP \to DL}$: Signal strength from AP to DL STA.
$S_{AP \to UL}$: Signal strength from AP to UL STA.
N: Noise plus other background interference.
$I_{Echo}$: Self-interference due to full-duplex operation.
$I_{UL \to DL}$: Signal strength from UL STA to DL STA.
$I_{DL \to UL}$: Signal strength from DL STA to UL STA.
$TH_{MCSx, no\ FCS}$: SINR threshold for decoding data send in MCS x, without FCS check.
$TH_{MCSx}$: SINR threshold for decoding data send in MCS x (with FCS check).
The smallest MCS mode is MCS 0 which represents BPSK with ½ coding.
$TH_{PreambleCapture}$: SINR threshold for detecting preamble when signal arrives later than interference.

In an exemplary aspect, for timing alignment, the AP 120 can be configured to estimate the start time of UL-ACK after decoding the PHY header of the UL data.

In this example, the DL packet length is short enough to be completely transmitted before the start time of UL-ACK. In addition, the DL data transmission ensure DL ACK do not collide with UL data reception (e.g., in the IEEE 802.11 standard, after successfully reception of a frame requiring acknowledgement, transmission of the ACK frame shall commence after a short interframe space (SIFS) period, without regard to the busy/idle state of the medium). In an exemplary aspect, when the DL packet is so short that DL data transmission ends SIFS before the end of UL data transmission, dummy data is padded to the DL data to ensure no overlap between reception of the DL-ACK and the UL data.

In an exemplary aspect, with respect to the efficiency of the joint DL-UL transmission, where the communication system includes a pair-able DL-STA with packet size satisfying all the above constraints, scheduling the FD-DL is more efficient than transmissions using extra resource to send the DL packet in HD.

In exemplary aspects described below with reference to FIGS. 4A-12, the criteria to trigger joint DL-UL transmission is reduced. For example, the above criteria generally includes that the AP is capable of pre-decoding MAC header before the final FCS check; a higher SINR requirement to pre-decoding MAC header without final FCS checking than the SINR required to decode the whole packet (e.g., $TH_{MCSx,no\ FCS} > TH_{MCSx}$ where x is the MCS mode used for UL data transmission); and a part of the UL-ACK having been interfered with by the DL-ACK. In this example, pair-able DL-UL STAs require not only $$\frac{S_{AP \to DL}}{I_{UL \to DL} + N} \geq TH_{MCSx_{DL}},$$

but also $$\frac{S_{AP \to UL}}{I_{DL \to UL} + N} \geq TH_{MCS0}$$

(i.e., the AUK is typically transmitted in MCS 0). Further, in cases where the transmit power of STAs are the same, both the signal strength from AP to DL STA and from AP to UL STA are to be considered when scheduling joint DL-UL transmission.

Figures 4A, 4B:
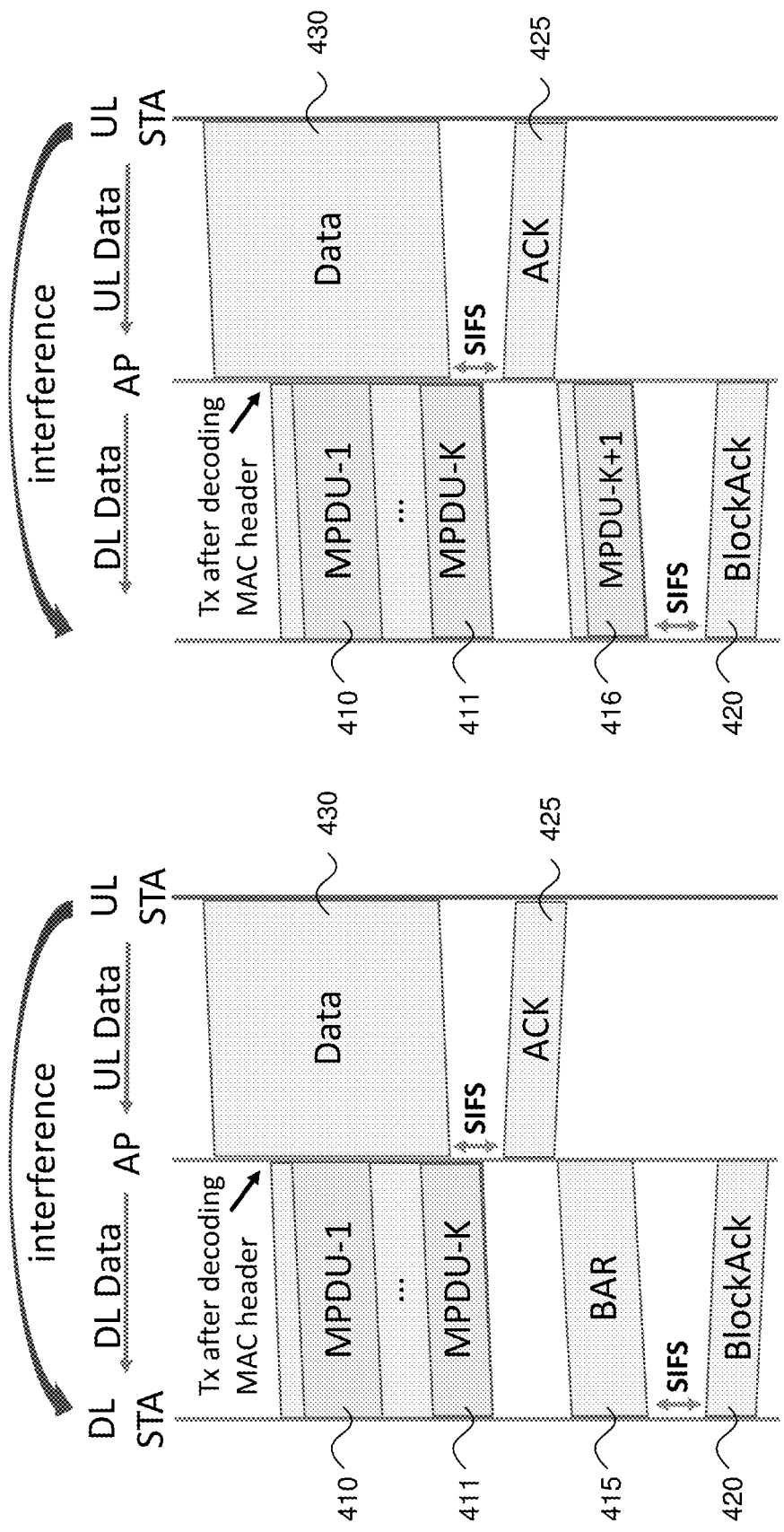
FIGS. 4A to 8 illustrate destination-based joint downlink (DL)-uplink (UL) transmission operations according to exemplary aspects of the present disclosure.
Figure 4C:
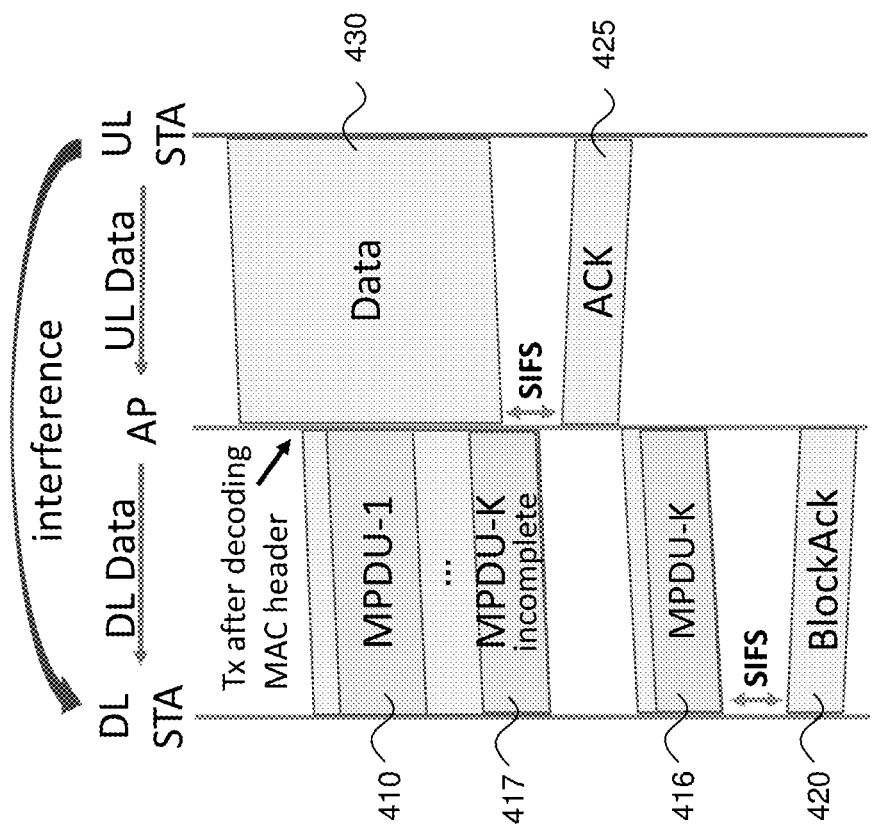

In exemplary aspects of the present disclosure, QoS STAs can be configured to relax the constraints above to increase joint DL-UL probability. Further, the initial joint DL-UL transmission can be offset to protect preamble detection. Adoption of BlockACK for FD-DL Transmission with QoS DL STA FIGS. 4A-4C illustrate destination-based joint DL-UL transmission operations according to exemplary aspects of the present disclosure. In the exemplary aspect, the joint DL-UL transmissions can adopt BlockACK for the FD-DL transmission with a QoS DL STA.

In an exemplary aspect and with reference to FIG. 4A, the AP 120 can be configured to communicate with the DL STA 140 in a block transmission mode for a DL QoS STA 140. For example, when the DL STA 140 is scheduled for joint transmission with another UL STA, each MPDU 410 for the FD-DL can have its ACK policy field set to Block ACK (BA). In this example, the DL ACK 420 can be delayed until the AP 120 sends out a Block ACK Request (BAR) 415. The AP 120 can delay the BAR 415 until the completion of UL ACK 425 that acknowledges the data 430. As a result, the UL ACK 425 can avoid intra-cell STA-to-STA interference. As illustrated, the transmission of the BlockAck 420 occurs after a short interframe space (SIFS) period. Similarly, the transmission of the ACK 425 occurs after a SIFS period.

With reference to FIG. 4B, a similar BlockACK procedure for an HT STA is illustrated. In an exemplary aspect, the BAR 415 can be replaced with transmitting another MPDU 416 having its ACK policy set to Normal ACK. In this example, DL STA will be triggered to transmit Block ACK 420 for all previously unacknowledged MPDUs 410.

FIG. 4C illustrates a BlockACK procedure according to an exemplary aspect that is similar to the operations shown in FIG. 4B. In this example, for an HT DL-STA 140, the AP 120 may choose to aggregate MPDUs 410 more aggressively. As shown in FIG. 4C, once the AP 120 detects that the UL transmission ends and the on-going DL MPDU 417 cannot be finished within the SIFS period, the AP 120 can terminate transmission of last MPDU 417 immediately. The AP 120 can then retransmit the MPDU 417 with Normal ACK setting after UL-ACK 425 transmission as shown by the MPDU 416. In an exemplary aspect, the BlockACK procedure of FIG. 4C can used when the AP 120 is not aware of the UL transmission duration. If known, the situation in which the incomplete MPDU 417 will be avoided because the AP 120 will know that the DL MPDU 417 will not be able to finish in time.

In an exemplary aspect, the BlockACK procedures illustrated in FIGS. 4A-4C can be utilized to trigger joint DL-UL transmission. In this example, the transmission can be triggered when the SINR conditions in Equations 1(a) to 1(d) are satisfied. That is, different from the baseline transmission criteria above, the utilization of the BlockAck procedures reduces the SINR conditions for triggering the trigger joint DL-UL transmission and thereby increasing the availability of the AP 120 to perform such transmissions.

Further, for timing alignment, after decoding the PHY header of UL data, the AP 120 can estimate the start time of UL-ACK 425. The AP 120 can schedule as many MPDUs 410 for FD-DL transmission so that the last MPDU 411 (FIGS. 4A and 4B) ends before the UL-ACK 425 start time. In this example, if less than one MPDU can be scheduled, the AP 120 can be configured to not trigger the FD-DL transmission. Advantageously, concern for DL-ACK collisions with UL-data 430 can be avoided because all DL-ACK 420 will be triggered by BAR 415 after the UL ACK 425.

In an exemplary aspect, in determining whether it is more efficient to use FD-DL transmissions for BlockACK procedures illustrated in FIG. 4A, scheduling FD-DL is more efficient when more than one MPDU are scheduled for FD-DL or when DL STA cannot support the IEEE 802.11n protocol because block ACK will be triggered by BAR even in HD-DL.

For a FD-DL transmission with only one MPDU to an HT-STA, the MPDU may as well be transmitted in HD with Normal ACK setting. In an exemplary aspect, the AP 120 can be configured to check whether transmission in HD is less efficient based on Equation 2 below:

$$T_{HD-DL} = \frac{L_{DL-MPDU}}{R(SINR_{HD-DL-data})} > T_{BAR} + \delta$$

where $T_{HD-DL}$ is the time duration required to transmit the MPDU (with $L_{DL-MPDU}$ bits) in HD mode, R is the function to map SINR to data rate, and δ is a channel sensing overhead constant that approximates channel sensing overhead and the offset time difference in BA and ACK transmissions.

If transmitting the DL MPDU 410 in HD (with Normal ACK setting) takes longer than transmitting BAR, the AP 120 can trigger FD-DL for single DL MPDU as it will be more efficient.

In an exemplary aspect, if $SINR_{FD-UL-ACK} \geq TH_{MCS0}$ is satisfied in addition to Equation 3, the AP 120 can be configured to choose to send BAR 415 right before UL-ACK 425 (where the AP 120 adjusts the number of FD-DL MPDU accordingly) and have DL-Block-ACK 420 transmission overlaps with UL-ACK 425.

In an exemplary aspect, when transmitting FD-DL using an aggregated MPDU (A-MPDU), if the UL transmission aborts early, the AP 120 can advantageously choose to terminate FD-DL transmission early and retransmit the un-sent MPDUs with higher modulation and coding scheme (MCS) because there would be little to no UL-DL interference.

Decoding of First MPDU Triggers FD-DL Transmission with HT UL STA

Figure 5:
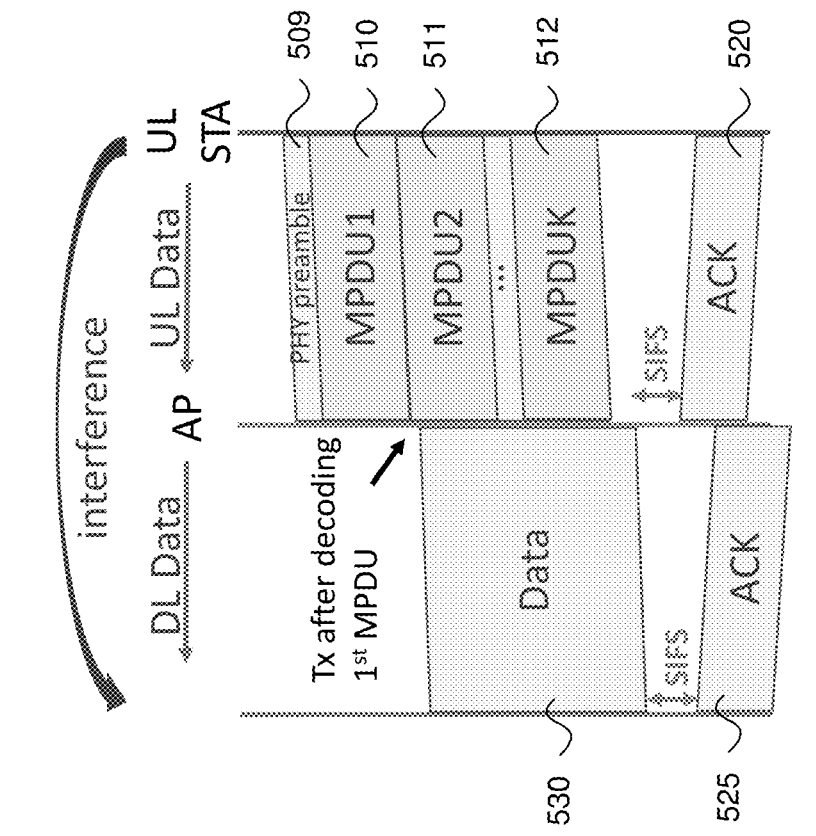

FIG. 5 illustrates destination-based joint DL-UL transmission operations according to exemplary aspects of the present disclosure. In the exemplary aspect, for HT UL STAs, the AP 120 can confirm that the AP 120 is the recipient of following MPDUs 511-512 by decoding the first MPDU 510. For example, when the HT UL STA is sending data in A-MPDU, the AP 120 can wait until successfully decoding the first MPDU 510 to confirm that the AP 120 is the recipient of following MPDUs 511-512 to trigger the FD-DL transmission.

In an exemplary aspect, the procedure illustrated in FIG. 5 can be utilized to trigger joint DL-UL transmission. In this example, the transmission can be triggered when the SINR conditions in Equations 1(b) to 1(e) are satisfied. That is, different from the general transmission criteria above, the utilization of the waiting until after the first MPDU 510 is decoded reduces the SINR conditions for triggering the trigger joint DL-UL transmission and thereby increasing the availability of the AP 120 to perform such transmissions. In this example, the SINR condition of Equation 1(a) is not applicable because the triggering is not based only on the MAC header.

In an exemplary aspect, for timing alignment, the AP 120 can be configured to estimate the start time of UL-ACK 520 after decoding the PHY header 509 of the UL data 530.

In an exemplary aspect, with respect to the efficiency of the joint DL-UL transmission, scheduling the FD-DL is more efficient than transmissions using extra resource to send the DL packet in HD.

In an exemplary aspect, when the AP 120 is configured to pre-decode the MAC header and when UL HD SINR is high enough for early MAC header decoding (without FCS check), the AP 120 can be configured to choose to trigger FD-DL transmission early. In this example, the chance for triggering joint DL-UL transmission can be advantageously increased by allowing initiation of the FD-DL transmission even when UL HD SINR is not high enough for early MAC header decoding.

Delaying FD-UL Transmission to Protect FD-DL Preamble Detection

In an exemplary aspect, with reference to FIG. 5, when the signal preamble is received before the interference, the required SINR for detection can be reduced. Further, interference that arrives during Legacy Short Training Field (L-STF) can have less impact than interference that arrives during Legacy Long Training Field (L-LTF) or Legacy Signal field (L-SIG). Therefore, in an exemplary aspect, to improve joint DL-UL transmission performance, FD-UL transmission can be delayed to protect FD-DL preamble detection. For example, additional time alignment can be added to ensure DL-ACK starts after UL-ACK (e.g., 4~8 µs) to protect preamble detection for UL-ACK. In an exemplary aspect, this additional time can be realized by padding dummy tone (e.g., dummy bits) in the end of DL data transmission.

Figure 6:
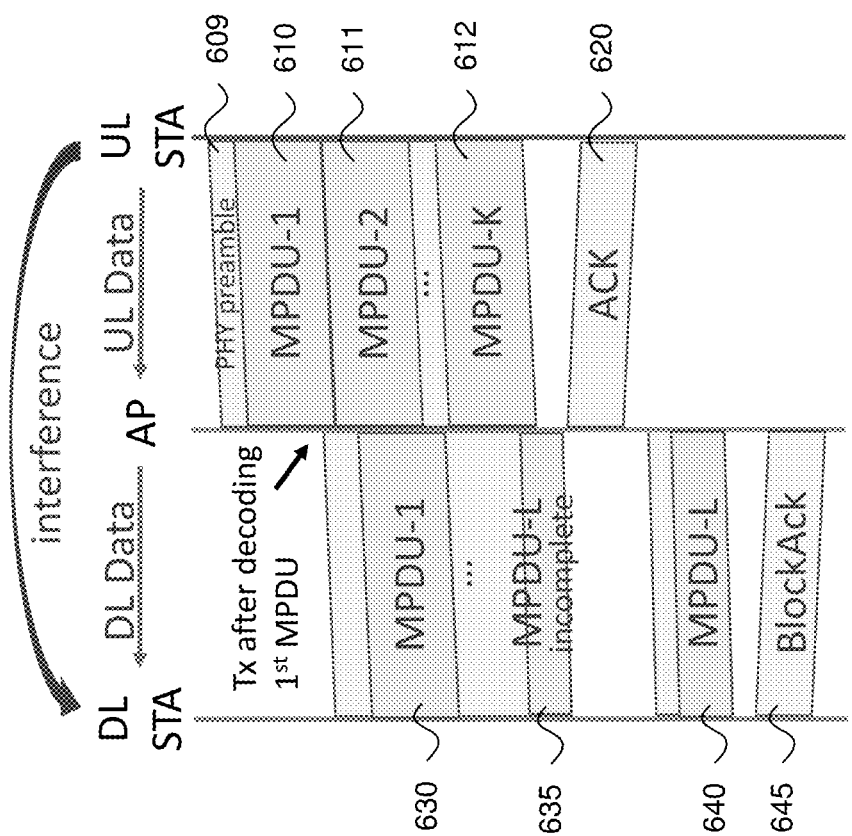

FIG. 6 illustrates destination-based joint DL-UL transmission operations according to exemplary aspects of the present disclosure.

In an exemplary aspect, if DL STA is a QoS STA and the UL HT STA sends data in A-MPDU, a combination of the aspects of procedures illustrated in FIGS. 4A-4C and FIG. 5 can further increase joint DL-UL transmission availability. In this example, although FIG. 6 illustrates the adoption of the BlockACK procedures of FIG. 4C, all the DL-ACK procedures described with reference to FIGS. 4A-4C can be applied to the current exemplary aspect.

With reference to FIG. 6, the DL MPDU 630 can be transmitted after the AP 120 decodes the first UL MPDU 610. If the AP 120 detects that the UL transmission ends and the on-going DL MPDU 635 cannot be finished, the AP 120 can terminate transmission of last MPDU 635 immediately. The AP 120 can then retransmit the MPDU 635 with Normal ACK setting after UL-ACK 620 transmission as shown by the MPDU 640.

In an exemplary aspect, procedure illustrated in FIG. 6 can be utilized to trigger joint DL-UL transmission. In this example, the transmission can be triggered when the SINR conditions in Equations 1(b) to 1(d) are satisfied. That is, different from the transmission criteria above, the combination of the aspects of procedures illustrated in FIGS. 4A-4C and FIG. 5 can further increase joint DL-UL transmission availability by reducing the SINR conditions for triggering the trigger joint DL-UL transmission. This increases the availability of the AP 120 to perform such transmissions.

In this exemplary aspect, the timing alignment criteria is similar to the time alignment criteria for the aspect illustrated with reference to FIGS. 4A-4C. Further, in an exemplary aspect, the efficiency to use FD-DL transmissions is similar to the aspects illustrated in FIG. 4A-4C.

UL STA Transmits with RTS

Figures 7A, 7B:
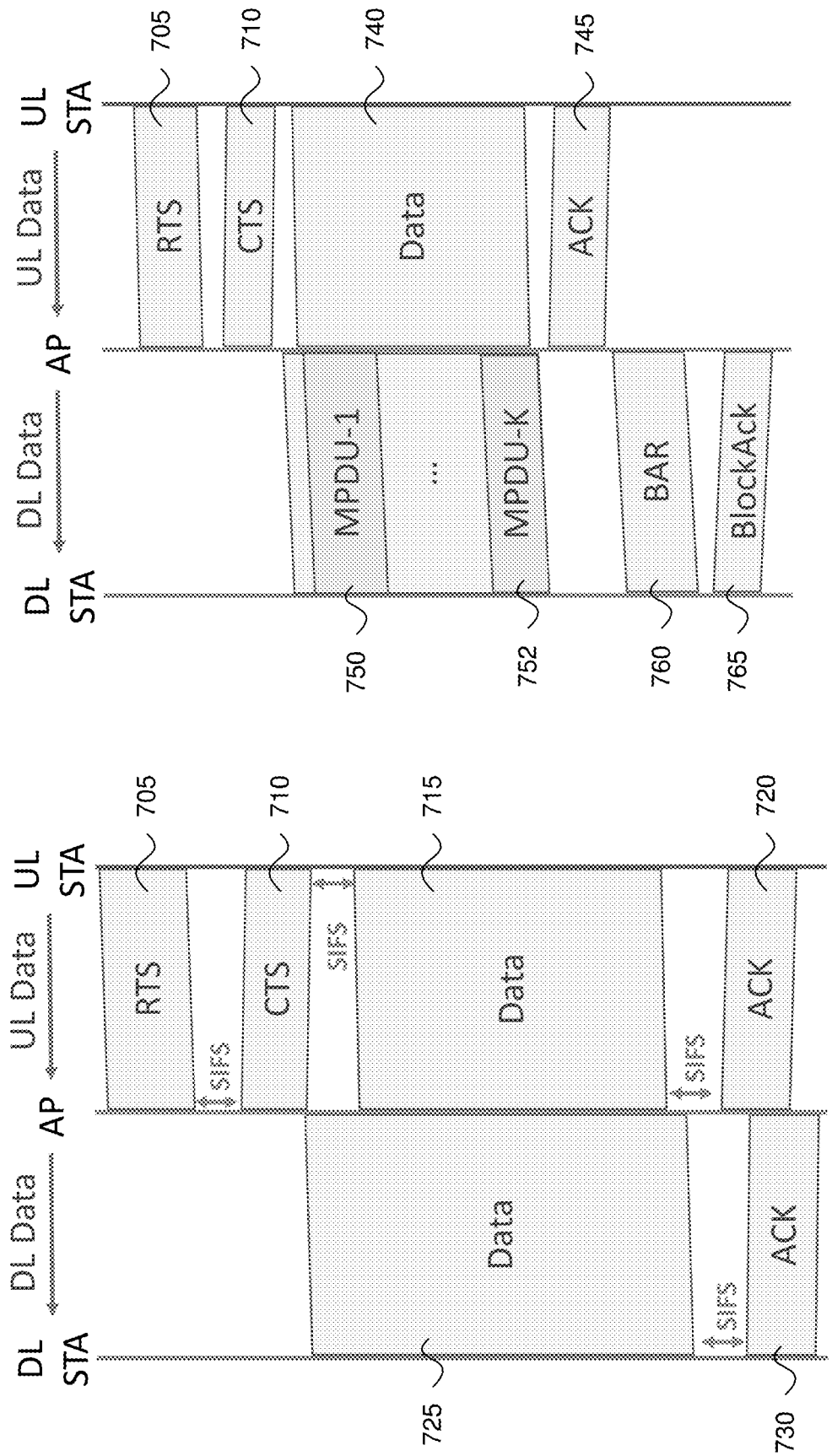
Figure 8:
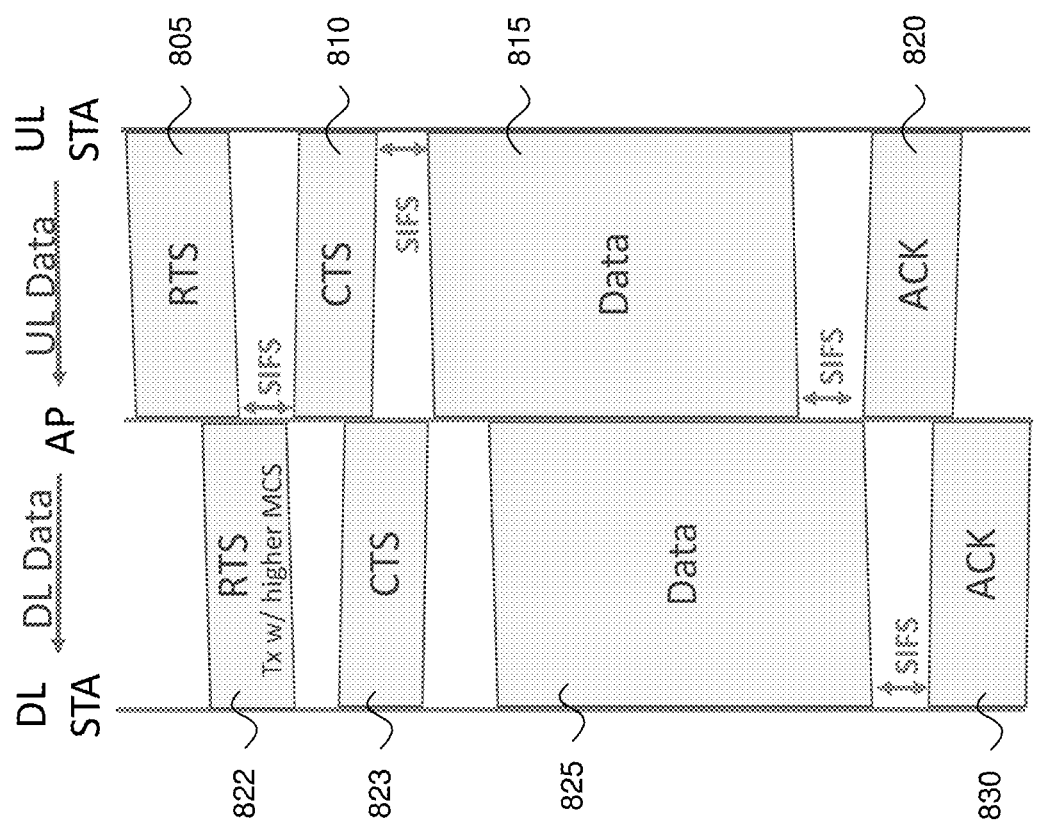

FIGS. 7A-7B and 8 illustrate destination-based joint DL-UL transmission operations utilizing Request-to-sent (RTS) communications according to exemplary aspects of the present disclosure. When the UL STA starts transmission with RTS, the AP 120 can begin to prepare for FD-DL transmission after decoding the destination address (DA) field of the RTS communication. In an exemplary aspect, the DL STA 140 can be configured to receive and decode DL data from AP 120 during non-zero network allocation vector (NAV).

FIGS. 7A-7B illustrate destination-based joint DL-UL transmission operations utilizing Request-to-sent (RTS) communications according to exemplary aspects of the present disclosure. In this example, the FD DL transmission starts after the clear-to-send (CTS) communication.

Based on the aspects described with reference to FIG. 5, in an exemplary aspect shown in FIG. 7A, the FD-DL transmission 725 can start before the FD-UL transmission 715 to protect FD-DL preamble. In a non-limiting example, the FD-DL transmission 725 can start, for example, 4~8 µs before the FD-UL transmission 715. In an exemplary aspect, by starting the transmission of the FD-DL 725 before the FD-UL transmission 715, the SINR condition illustrated in Equation 1(c) can be omitted. The FD-DL transmission can start at other time periods before the FD-UL transmission 715 as would be understood by one of ordinary skill in the relevant arts. In an exemplary aspect, the AP 120 can utilize RTS/CTS procedures to ensure that the FD-DL transmission 725 start before the FD-UL transmission 715. In this example, the AP 120 can be configured to send a CTS communication 710 to the UL STA 140 in response to a RTS communication 705 from the UL STA 140. As shown in FIG. 7A, a short interframe space (SIFS) period occurs between the DL data 725 and the DL ACK 730, between the RTS 705 and CTS 710, between the CTS 710 and the UL data 715, and between the UL data 715 and the UL ACK 720.

In an exemplary aspect, if the DL ACK 730 and UL ACK 720 overlapped in time as illustrated in FIG. 7A, extra bits can be padded to the DL data 725 so that FD-UL ACK 720 starts before (e.g., 4~8 µs) the FD-DL ACK 730. In an exemplary aspect, although FIG. 7B illustrates a similar adoption of the BlockACK procedures of FIG. 4A, for DL QoS STAs, all the DL-ACK procedures described with reference to FIGS. 4A-4C can be applied to the destination-based joint DL-UL transmission operations utilizing RTS communications.

As shown in FIG. 7B, the RTS 705 and CTS 710 procedure ensures that the transmission of the UL data 740 occurs after the DL data transmission using MPDUs 750-752. A BlockAck procedure can also be used to acknowledge the DL data. In this example, the BAR 760 is transmitted by the AP 120 after the UL ACK 745 is received by the AP 120 to ensure that the UL ACK 745 and DL ACK (i.e., BlockACK 765) do not conflict with each other. That is, the DL ACK and the UL ACK 745 are time-domain multiplexed so as to not overlap using the BAR 760.

In an exemplary aspect, the RTS/CTS procedures illustrated in FIGS. 7A-7B can be utilized to trigger joint DL-UL transmission when the SINR conditions in Equations 1(b) and 1(d) are satisfied. If the DL ACK 730 and the UL ACK 720 overlap as shown in FIG. 7A, the SINR conditions can also include Equation 1(e). In an exemplary aspect, if the FD-DL (e.g., 725, 750) is started before the FD-UL transmission (e.g., 715, 750), the SINR condition illustrated in Equation 1(c) can be omitted. That is, different from the transmission criteria above, the aspects of procedures illustrated in FIGS. 7A-7B can further increase joint DL-UL transmission availability by reducing the SINR conditions for triggering the trigger joint DL-UL transmission. This increases the availability of the AP 120 to perform such transmissions.

In this exemplary aspect, the timing alignment criteria is similar to the time alignment criteria for the aspect illustrated with reference to FIGS. 4A-4C when using BlockACK procedures for the DL operations. Otherwise, extra bits can be padded to the DL data 725 so that FD-UL ACK 720 starts before the FD-DL ACK 730.

In an exemplary aspect, with respect to the efficiency of the joint DL-UL transmission, the efficiency is similar to the efficiency criteria for the aspect illustrated with reference to FIGS. 4A-4C when using BlockACK procedures for the DL operations. Otherwise, the scheduling the FD-DL is more efficient than transmissions using extra resource to send the DL packet in HD where the communication system includes a pair-able DL-STA with packet size satisfying the above constraints.

FIG. 8 illustrates destination-based joint DL-UL transmission operations utilizing a fast RTS-CTS procedure after decoding of the RTS DA field according to exemplary aspects of the present disclosure. In this example, the FD DL transmission starts after the clear-to-send (CTS) communication.

In an exemplary aspect, a fast RTS-CTS can be inserted before DL transmission to add extra protection at the DL STA 140 from interference from hidden nodes. For example, the RTS 822 is generated by the AP 120 and sent to the DL STA 140. In an exemplary aspect, to end the DL-RTS 822 transmission before the start of UL-CTS 810, the DL-RTS 822 can be sent in a higher Modulation and Coding Scheme (MCS). For example, the AP 120 can be configured to immediately transmit the DL RTS 822 after decoding the RTS DA field. In this example, the available time for completing the RTS transmission is can be, for example, 16 µs (time to transmit Source Address (SA) & frame check sequence (FCS))+SIFS, but is not limited thereto. In an exemplary aspect, the AP 120 is configured to decode the MAC header without FCS check and includes a sufficiently high UL SINR for early MAC header decoding.

In exemplary aspects, where the DL-CTS 823 overlaps with the UL-CTS 810, the AP 120 can be configured to have an SINR for the UL CTS 810 that is sufficient to compensate for the interference from the DL CTS 823. In this example, this SINR value is similar to the SINR requirement when the DL and UL ACKs overlap.

In an exemplary aspect, when operating at 2.4 GHz and where SIFS is, for example, 10 µs, the AP 120 can be configured to transmit the DL-RTS 822 within 26 µs and with a data rate greater than 48 Mbps. When operating at 5 GHz and where SIFS is 16 µs, the AP 120 can be configured to transmit the DL-RTS 822 at data rate greater than 18 Mbps. The SIFS value and data rates are not limited to these exemplary values and can be other values as would be understood by one of ordinary skill in the relevant arts.

In an exemplary aspect, if the DL STA 140 fails to decode the FD-RTS 822, the AP 120 can be configured to schedule the FD-DL transmission at a later time with a lower MCS. Further, because the UL CTS 810 may interfered with the DL CTS 823, the AP 120 can be configured to not start the DL-RTS 822 transmission unless it has a high confidence from one or more past measurements that the DL STA to UL STA interference will not affect the CTS reception.

In an exemplary aspect, the fast RTS/CTS procedures illustrated in FIG. 8 can be utilized to trigger joint DL-UL transmission when the SINR conditions in Equations 1(a) to 1(e) are satisfied. Further, the timing alignment criteria and the efficiency criteria is similar to the baseline time alignment criteria and the baseline efficiency criteria.

Example Source-Based Joint DL-UL Transmission Operations

As described above, in sourced-based joint DL-UL transmission, the AP wins the channel contention process for DL transmission and triggers another STA for FD-UL transmission.

In source-based joint DL-UL transmissions, the AP 120 is granted channel access to send the first packet. As described above, source-based transmissions can include when the AP 120 wins the contention period, and can include a distributed coordination function (DCF) and the QoS-STA with UL traffic can be polled. In exemplary aspects, the AP 120 can be configured to implement HCF (hybrid coordination function) controlled channel access (HCCA) to poll a QoS-STA for UL transmission and then schedule concurrent DL transmissions with a pair-able STA 140.

In exemplary aspects, QoS Contention-Free-Poll (CF-Poll) can be used to achieve source-based joint DL-UL transmission. Further, the polling operations can also be used for Point coordination function (PCF) contention free (CF)-pollable UL STAs.

HCCA to Poll QoS UL STA

Figures 9A, 9B:
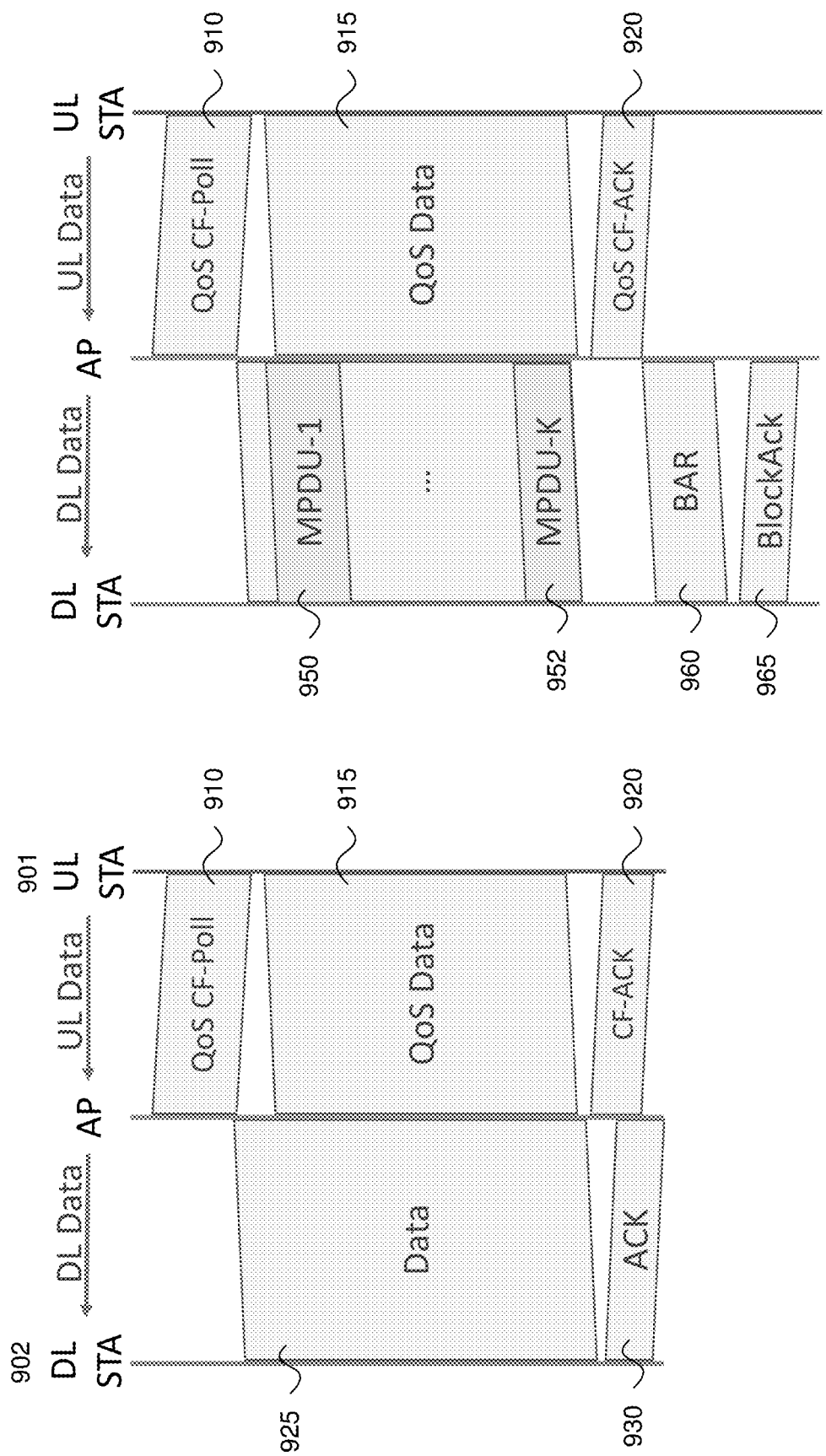

FIGS. 9A-9B illustrate sourced-based joint DL-UL transmission operations utilizing HCCA to poll the QoS-STA according to exemplary aspects of the present disclosure. In an exemplary aspect, the AP 120 can be configured to use QoS and CF-Poll operations to poll an UL QoS STA 140 for uplink transmission. The AP 120 can then transmit to a pair-able DL STA 140 simultaneously while receiving UL data.

In an exemplary aspect, when the AP 120 wins channel contention, the AP 120 can be configured to trigger a QoS STA 140 to send an UL packet 915 by sending a CF-Poll frame 910 to STA 901. After transmitting the CF-Poll frame 910, the AP 120 can start a DL transmission 925 to a STA 902 pair-able to the polled UL STA 901. In an exemplary aspect, the DL transmission is performed concurrently with the UL transmission 915 from the polled UL STA 901. The AP 120 can then send a CF-ACK 920 to the STA 901 to acknowledge the UL transmission 915. Similarly, the AP can receive an ACK 930 to acknowledge that the STA 902 has received the data 925.

In an exemplary aspect, the AP 120 includes knowledge of a queue-size for the UL traffic 915 obtained from, for example, a QoS STA queue report, a high layer message exchange, and/or other queue information procedures as would be understood by one of ordinary skill in the relevant arts. The AP 120 can be configured to poll a QoS STA 901 with UL data and announce a Transmit Opportunity (TXOP) duration in the QoS CF-Poll message 910 based on the queue-size information of the UL QoS STA 901. Based on the TXOP information, the AP 120 can schedule DL transmissions accordingly with the STA 902.

As shown in FIG. 9A, the DL ACK 930 overlaps with the UL ACK 920. In an exemplary aspect, if the DL STA 902 is a QoS STA, then the Block ACK operations illustrated in FIGS. 4A-4C can be applied to the current sourced-based joint DL-UL transmission operations. For example, a Block-ACK operation similar to the operation illustrated in FIG. 4A is shown in FIG. 9B. In an exemplary aspect, the FD-DL transmission starts before (e.g., 4-8 µs) the UL transmission similar to the aspects described above with reference to FIG. 7A to increase DL preamble detection.

In an exemplary aspect, the procedures illustrated in FIGS. 9A-9B can be utilized to trigger joint DL-UL transmission when the SINR conditions in Equations 1(b) and 1(d) are satisfied. If the DL ACK 930 and the CF ACK 920 overlap as shown in FIG. 9A, the SINR conditions can also include Equation 1(e). That is, different from the transmission criteria above, the aspects of procedures illustrated in FIGS. 9A-9B can further increase joint DL-UL transmission availability by reducing the SINR conditions for triggering the trigger joint DL-UL transmission. This increases the availability of the AP 120 to perform such transmissions.

In this exemplary aspect, for the timing alignment criteria, the AP 120 can be configured to start the DL data 925 before (e.g., 1-8 µs) the UL data 915. In an exemplary aspect, for QoS DL STAs, the AP 120 can perform BlockACK operations similar to those illustrated in FIGS. 4A-4C. For example, the AP 120 can estimate the start time of the QoS CF-ACK 920. The AP 120 can schedule as many MPDUs 951-952 for the FD-DL transmission so that the last MPDU 952 ends before the QoS CF-ACK 920 start time. In this example, if less than one MPDU can be scheduled, the AP 120 can be configured to not trigger the FD-DL transmission. Advantageously, concern for DL-ACK collisions with UL-data 915 can be avoided because the DL-ACK will be triggered by BAR 960 after the QoS CF-ACK 920. The BlockACK 965 can then acknowledge BAR 960.

For non-QoS DL STAs, the AP 120 can be configured to determine (e.g., estimate) a DL transmission duration based on the TXOP setting in the QoS CF-Poll frame 910. If the DL transmission 925 ends early, the AP 120 can pad dummy bits to the end of the data 925 as suggested above.

In exemplary aspects where the DL data 925 takes longer than the UL data 915, the AP 120 can be configured to discard one of the DL and UL transmissions. Also, where the UL data 915 is transmitted without requiring ACK, there is no constraint on the DL transmit duration of the DL data 925.

In an exemplary aspect, with respect to the efficiency of the joint DL-UL transmission, it is more efficient to transmit in FD if the joint DL-UL transmission can be aligned as described above. In exemplary aspects where the DL transmission may end after the start of CF-ACK, the AP 120 can determine which transmit direction to drop based on the following: (1) if the retransmission of the DL in HD is more efficient than to complete the ongoing DL transmission and retransmit the UL in HD, the AP 120 can stop the DL transmission and prepare for the UL CF-ACK; or (2) the AP 120 can continue transmitting DL data and the UL STA will retransmit the un-acknowledged data at a later time.

Figures 10, 11:
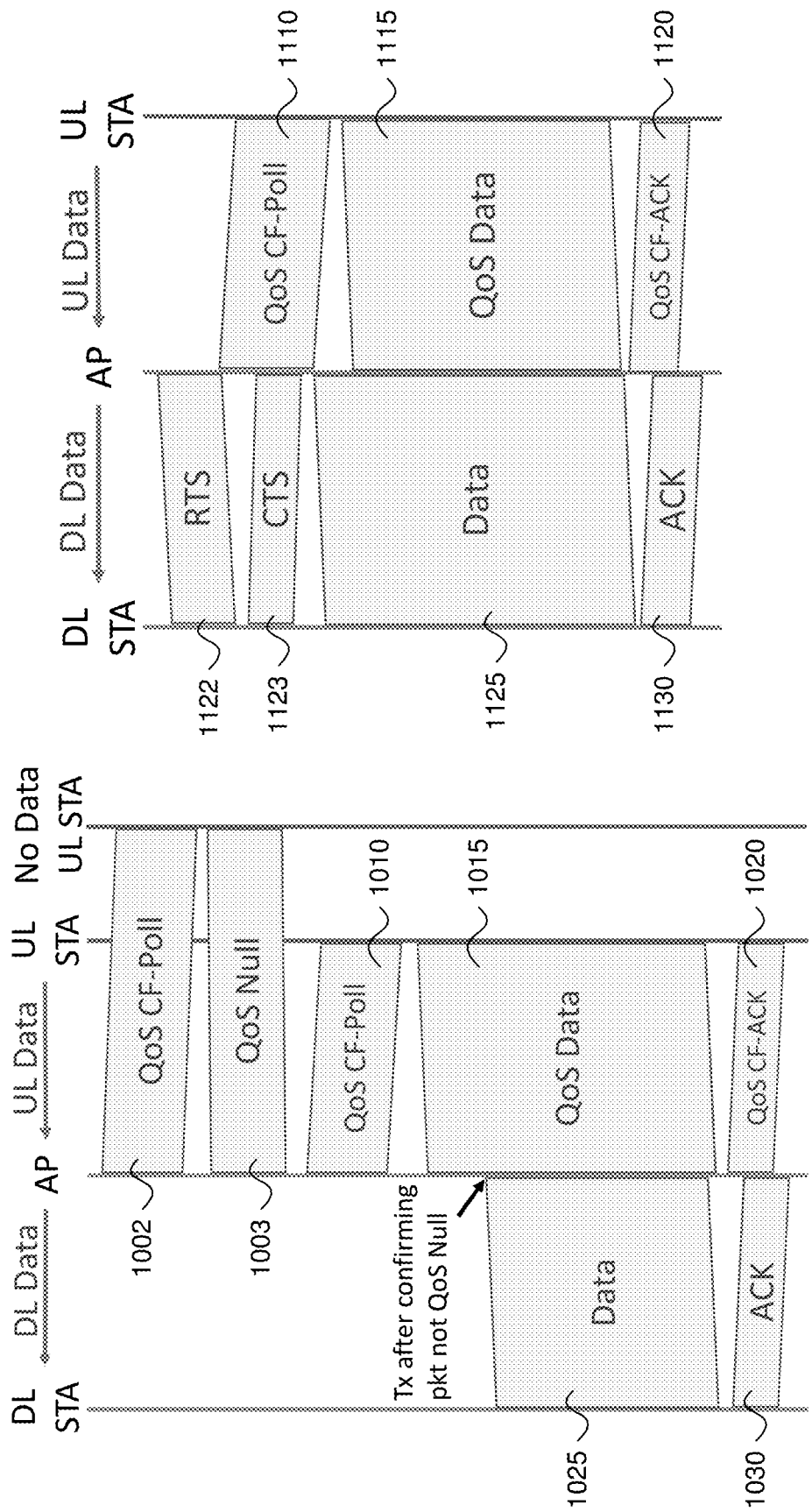

FIG. 10 illustrates a sourced-based joint DL-UL transmission operations utilizing HCCA to poll the QoS-STA according to exemplary aspects of the present disclosure.

In an exemplary aspect where the AP 120 has no knowledge of whether a QoS STA has UL traffic to send, the UL STA can be configured to reply to the QoS CF Poll 1002 with a QoS Null 1003 after the QoS CF-Poll 1002. In this example, the DL transmission 1025 is triggered after the AP 120 detects that the UL PHY preamble indicates a longer packet length. That is, the AP 120 can be configured to trigger the UL transmission 1015 via a QoS CF-Poll 1010 and start FD-DL transmission 1025 after the AP 120 detects that the UL packet size is longer than QoS Null 1003.

In this example, the AP 120 can be configured to initiate the DL data transmission 1025 after the AP 120 detects that the received packet QoS CF-Poll 1010 is coming is coming from a UL STA that has data to send and is not a null packet 1003 coming from a UL STA with no data to send. The DL data 1025 can be acknowledged by the DL STA using an ACK 1030 sent to the AP 120. The QoS data 1015 is acknowledged by the AP 120 using the QoS CF ACK 1020.

In an exemplary aspect, the procedures illustrated in FIG. 10 can be utilized to trigger joint DL-UL transmission when the SINR conditions in Equations 1(b) to 1(d) are satisfied. In this example, the Equation 1(c) is used because the UL interference may start before the DL signal. If the DL ACK 1030 and the CF ACK 102 overlap as shown in FIG. 10, the SINR conditions can also include Equation 1(e). In an exemplary aspect, the BlockACK procedures illustrated in FIG. 4A, FIG. 4B, and/or FIG. 4C can be adopted to the aspects illustrated in FIG. 10 to further increase joint DL-UL transmission availability by reducing the SINR conditions for triggering the trigger joint DL-UL transmission.

In an exemplary aspect, the efficiency criteria is similar to the aspects described above with reference FIGS. 9A-9B. For the time alignment, the criteria is similar to the alignment operations according to the aspects described above with reference FIGS. 9A-9B, but also include that the DL transmission 1025 should start after decoding the UL PHY preamble in an exemplary aspect.

FIG. 11 illustrates a sourced-based joint DL-UL transmission operations utilizing HCCA to poll the QoS-STA according to exemplary aspects of the present disclosure. This configuration is similar to the aspects illustrated in FIGS. 9A-10, but the AP 120 can be configured to send a RTS communication 1122 to the DL STA and the DL STA can reply with a CTS communication 1123. In this aspect, the DL STA can be advantageously protected from hidden nodes by utilizing the RTS/CTS procedures (RTS 1122 and CTS 1123).

In an exemplary aspect, the AP 120 can be configured to send the QoS CF-Poll 1110 to UL STA with the additional DL STA to UL STA interference.

In this example, the AP 120 can select appropriate MCS for QoS CF-Poll transmission such that the transmission time for the QoS CF-Poll 1110 is shorter than a CTS transmission time plus two SIFS periods.

In an exemplary aspect, the UL STA can be configured such that the UL STA will reset its NAV setting if the UL STA receives another packet from the same source that sets the previous NAV.

In an exemplary aspect, the procedures illustrated in FIG. 11 can be utilized to trigger joint DL-UL transmission when the SINR conditions in Equations 1(b) to 1(d) are satisfied similar to the aspects illustrated in FIG. 10, but also include Equation 1(e)

$$\left( e.g., \frac{S_{AP \to UL}}{I_{DL \to UL} + N} \geq TH_{MCS_{x}CF_{poll}} \right).$$

In an exemplary aspect, for the operations illustrated in FIG. 11, the efficiency criteria and the alignment operations are similar to the aspects described above with reference FIGS. 9A-9B.

Source-Based Joint DL-UL TX Using PCF to Poll Non-QoS CF-Pollable UL STA

Figure 12:
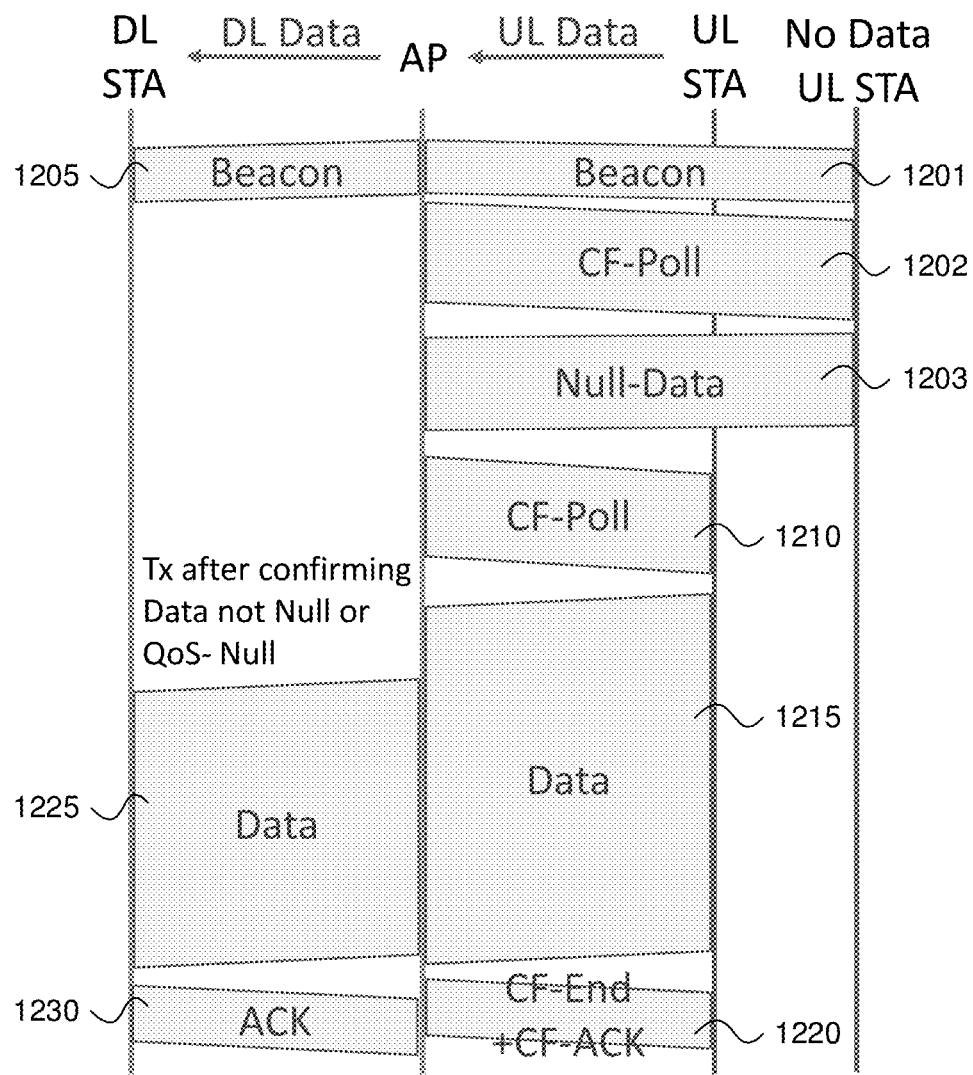

FIG. 12 illustrates a sourced-based joint DL-UL transmission operations utilizing polling for non-QoS STAs according to exemplary aspects of the present disclosure.

In an exemplary aspect, for non-QoS STAs, if the STAs are CF-pollable, the AP 120 can be configured to send CF-poll 1210 to trigger their UL transmission based on a Point coordination function (PCF). This aspect is similar to the operations of the aspects described with reference to FIG. 10, but include the following variations. First, the CF-poll is sent during contention free period (CFP) of PCF operation. The contention free period starts with AP 120 broadcasting beacons 1201, 1205 and ends with the AP broadcasting CF-End 1220. Second, the CF-poll does not contain a QoS field and therefore there is no TXOP duration defined. In some cases, the non-QoS UL STA is unable to report queue size information.

In an exemplary aspect, for the operations illustrated in FIG. 12, the SINR, efficiency, and alignment criteria are similar to the aspects described above with reference FIG. 10.

Examples

Example 1 is a method adapted for establishing joint communications between an access point (AP) and first and second communication stations (STAs), the method comprising: calculating joint transmission information based on the first and the second STAs; establishing a first communication between the AP and the first STA; and establishing a second communication between the AP and the second STA based on the joint transmission information.

In Example 2, the subject matter of Example 1, wherein calculating the joint transmission information comprises: calculating interference information associated with the AP and the first and the second STAs; calculating communication alignment information for communications between the AP and the first and the second STAs; and calculating efficiency information for the communications between the AP and the first and the second STA.

In Example 3, the subject matter of Example 2, wherein the interference information includes signal-to-noise ratio information between the AP and the first and the second STAs.

In Example 4, the subject matter of Example 1, wherein the AP is configured to communicate in a full-duplex operation and the first and the second STAs are configured to communicate in a half-duplex operation.

In Example 5, the subject matter of Example 1, wherein the first communication is an uplink communication from the first STA to the AP, and the second communication is a downlink communication from the AP to the second STA.

In Example 6, the subject matter of Example 1, wherein establishing the second communication comprises: delaying an acknowledgement from the second STA to the AP until after an acknowledgment from the AP is received by the first STA.

In Example 7, the subject matter of Example 1, wherein establishing the second communication comprises: transmitting, by the AP, a first protocol data unit (PDU) comprising an acknowledge policy set to block acknowledgment; and transmitting, by the AP, a block acknowledgment request (BAR) to the second STA to delay an acknowledgement from the second STA to the AP until after an acknowledgment from the AP is received by the first STA.

In Example 8, the subject matter of Example 1, wherein establishing the second communication comprises: transmitting, by the AP, a first protocol data unit (PDU) comprising an acknowledge policy set to block acknowledgment; and transmitting, by the AP, a second PDU comprising an acknowledgment policy set to a normal acknowledgment to delay an acknowledgement from the second STA to the AP until after an acknowledgment from the AP is received by the first STA.

In Example 9, the subject matter of Example 1, wherein establishing the second communication comprises: decoding a first protocol data unit (PDU) received by the AP from the first STA; and establishing the second communication based on the decoded first PDU.

In Example 10, the subject matter of Example 1, wherein establishing the second communication comprises: padding a data block of the second communication with one or more dummy bits to delay an acknowledgement from the second STA to the AP until after transmission of an acknowledgment from the AP to the first STA has been initiated by the AP.

In Example 11, the subject matter of Example 1, wherein establishing the second communication comprises: transmitting a clear-to-send (CTS) packet to the first STA in response to a request-to-send (RTS) packet from the first STA to initiate a transmission of a data block from the AP to the second STA before reception of a data block from the first STA to the AP.

In Example 12, the subject matter of Example 11, wherein establishing the second communication further comprises: transmitting, by the AP, a block acknowledgment request (BAR) to the second STA to delay an acknowledgement from the second STA to the AP until after an acknowledgment from the AP is received by the first STA; or padding the data block of the second communication with one or more dummy bits to delay reception of the acknowledgement from the second STA by the AP until after transmission of an acknowledgment from the AP to the first STA has been initiated by the AP, wherein the acknowledgment from the second STA acknowledges reception of the data block of the second communication by the second STA and the acknowledgment from the AP acknowledges reception of the data block of the first communication from the first STA by the AP.

In Example 13, the subject matter of Example 1, wherein establishing the first communication comprises: transmitting, by the AP, a poll frame to the first STA to trigger transmission of a data block from the first STA to the AP.

Example 14 is an access point (AP) operable to establish joint communications with first and second communication stations (STAs), comprising: a transceiver configured to communicate with the first and the second STAs; and a controller coupled to the transceiver and is configured to: calculate joint transmission information based on the first and the second STAs; control the transceiver to establish a first communication with the first STA; and control the transceiver to establish a second communication with the second STA based on the joint transmission information.

In Example 15, the subject matter of Example 14, wherein calculating the joint transmission information comprises: calculating interference information associated with the AP and the first and the second STAs; calculating communication alignment information for communications between the AP and the first and the second STAs; and calculating efficiency information for the communications between the AP and the first and the second STA.

In Example 16, the subject matter of Example 14, wherein the first communication is an uplink communication from the first STA to the AP, and the second communication is a downlink communication from the AP to the second STA.

In Example 17, the subject matter of Example 14, wherein establishing the second communication comprises: delaying reception of an acknowledgement by the AP from the second STA until after an acknowledgment from the AP is received by the first STA.

In Example 18, the subject matter of Example 14, wherein the establishing the second communication comprises: transmitting, by the transceiver, a first protocol data unit (PDU) comprising an acknowledge policy set to block acknowledgment; and transmitting, by the transceiver, a block acknowledgment request (BAR) to the second STA to delay reception of an acknowledgement from the second STA by the AP until after an acknowledgment from the AP is received by the first STA.

In Example 19, the subject matter of Example 14, wherein establishing the second communication comprises: transmitting, by the transceiver, a first protocol data unit (PDU) comprising an acknowledge policy set to block acknowledgment; and transmitting, by the AP, a second PDU comprising an acknowledgment policy set to a normal acknowledgment to delay an acknowledgement from the second STA to the AP until after an acknowledgment from the AP is received by the first STA.

In Example 20, the subject matter of Example 14, wherein establishing the second communication comprises: decoding a first protocol data unit (PDU) received by the AP from the first STA; and establishing the second communication based on the decoded first PDU.

In Example 21, the subject matter of Example 14, wherein establishing the second communication comprises: padding a data block of the second communication with one or more dummy bits to delay reception of an acknowledgement from the second STA by the AP until after transmission of an acknowledgment from the AP to the first STA has been initiated by the AP.

In Example 22, the subject matter of Example 14, wherein establishing the second communication comprises: transmitting a clear-to-send (CTS) packet to the first STA in response to a request-to-send (RTS) packet from the first STA to initiate a transmission of a data block by the transceiver to the second STA before reception of a data block from the first STA to the AP.

In Example 23, the subject matter of Example 22, wherein establishing the second communication further comprises: transmitting, by the transceiver, a block acknowledgment request (BAR) to the second STA to delay reception of an acknowledgement from the second STA by the AP until after an acknowledgment from the AP is received by the first STA; or padding the data block of the second communication with one or more dummy bits to delay the reception of the acknowledgement from the second STA by the AP until after transmission of the acknowledgment from the AP to the first STA has been initiated, wherein the acknowledgment from the second STA acknowledges reception of the data block of the second communication by the second STA and the acknowledgment from the AP acknowledges reception of the data block of the first communication from the first STA by the AP.

In Example 24, the subject matter of Example 14, further comprising a memory that stores the joint transmission information.

In Example 25, the subject matter of Example 15, further comprising a memory that stores the interference information, the communication alignment information, and the efficiency information.

Example 26 is a communication method to communicate between an access point (AP) and first and second communication stations (STAs), comprising: calculating joint transmission information based on the first and the second STAs, the joint transmission information comprising: interference information associated with the AP and the first and the second STAs; communication alignment information for communications between the AP and the first and the second STAs; and efficiency information for the communications between the AP and the first and the second STA; establishing an uplink communication between the AP and the first STA; and establishing a downlink communication between the AP and the second STA jointly with the uplink communication between the AP and the first STA based on the joint transmission information.

In Example 27, the subject matter of Example 26, wherein establishing the downlink communication comprises: delaying reception of an acknowledgement from the second STA by the AP until after an acknowledgment from the AP is received by the first STA.

Example 28, is an access point (AP) configured to perform the method of any of claims 1-13, 26, and 27.

Example 29 is a communication station (STA) configured to perform the method of any of claims 1-13, 26, and 27.

Example 30 is an apparatus comprising means to perform the method as claimed in any of claims 1-13, 26, and 27.

Example 31 is a computer program product embodied on a computer-readable medium comprising program instructions, when executed, causes a machine to perform the method of any of claims 1-13, 26, and 27.

Example 32 is an apparatus substantially as shown and described.

Example 33 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to the IEEE 802.11 standards. The exemplary aspects can be applied to other wireless communication protocols/standards (e.g., Long-term Evolution—LTE) as would be understood by one of ordinary skill in the relevant arts.

What is claimed is:

1. A method adapted for establishing joint communications between an access point (AP) and first and second communication stations (STAs), the method comprising:
    calculating joint transmission information based on the first and the second STAs, wherein calculating the joint transmission information includes estimating a start time of an uplink acknowledgement, after decoding a header of uplink data, to determine timing alignment information for communications between the AP and the first and the second STAs;
    establishing a first communication between the AP and the first STA; and
    establishing a second communication between the AP and the second STA based on the joint transmission information.

2. The communication method of claim 1, wherein calculating the joint transmission information comprises:
    calculating interference information associated with the AP and the first and the second STAs;
    calculating the timing alignment information for communications between the AP and the first and the second STAs; and
    calculating efficiency information for the communications between the AP and the first and the second STA.

3. The communication method of claim 2, wherein the interference information includes signal-to-noise ratio information between the AP and the first and the second STAs.

4. The communication method of claim 1, wherein the AP is configured to communicate in a full-duplex operation and the first and the second STAs are configured to communicate in a half-duplex operation.

5. The communication method of claim 1, wherein the first communication is an uplink communication from the first STA to the AP, and the second communication is a downlink communication from the AP to the second STA.

6. The communication method of claim 1, wherein establishing the second communication comprises: delaying an acknowledgement from the second STA to the AP until after an acknowledgment from the AP is received by the first STA.

7. The communication method of claim 1, wherein establishing the second communication comprises:
    transmitting, by the AP, a first protocol data unit (PDU) comprising an acknowledge policy set to block acknowledgment; and
    transmitting, by the AP, a block acknowledgment request (BAR) to the second STA to delay an acknowledgement from the second STA to the AP until after an acknowledgment from the AP is received by the first STA.

8. The communication method of claim 1, wherein establishing the second communication comprises:
   transmitting, by the AP, a first protocol data unit (PDU) comprising an acknowledge policy set to block acknowledgment; and
   transmitting, by the AP, a second PDU comprising an acknowledgment policy set to a normal acknowledgment to delay an acknowledgement from the second STA to the AP until after an acknowledgment from the AP is received by the first STA.

9. The communication method of claim 1, wherein establishing the second communication comprises:
   decoding a first protocol data unit (PDU) received by the AP from the first STA; and
   establishing the second communication based on the decoded first PDU.

10. The communication method of claim 1, wherein establishing the second communication comprises:
    padding a data block of the second communication with one or more dummy bits to delay an acknowledgement from the second STA to the AP until after transmission of an acknowledgment from the AP to the first STA has been initiated by the AP.

11. The communication method of claim 1, wherein establishing the second communication comprises:
    transmitting a clear-to-send (CTS) packet to the first STA in response to a request-to-send (RTS) packet from the first STA to initiate a transmission of a data block from the AP to the second STA before reception of a data block from the first STA to the AP.

12. The communication method of claim 11, wherein establishing the second communication further comprises:
    transmitting, by the AP, a block acknowledgment request (BAR) to the second STA to delay an acknowledgement from the second STA to the AP until after an acknowledgment from the AP is received by the first STA; or
    padding the data block of the second communication with one or more dummy bits to delay reception of the acknowledgement from the second STA by the AP until after transmission of an acknowledgment from the AP to the first STA has been initiated by the AP, wherein the acknowledgment from the second STA acknowledges reception of the data block of the second communication by the second STA and the acknowledgment from the AP acknowledges reception of the data block of the first communication from the first STA by the AP.

13. The communication method of claim 1, wherein establishing the first communication comprises: transmitting, by the AP, a poll frame to the first STA to trigger transmission of a data block from the first STA to the AP.

14. The communication method of claim 1, wherein calculating the joint transmission information comprises calculating efficiency information for the communications between the AP and the first and the second STA, the efficiency information being calculated based on a comparison of full-duplex and half-duplex operations by the AP.

15. An access point (AP) operable to establish joint communications with first and second communication stations (STAs), comprising:
    a transceiver configured to communicate with the first and the second STAs; and
    a controller coupled to the transceiver and is configured to:
       calculate joint transmission information based on the first and the second STAs, wherein calculating the joint transmission information includes estimating a start time of an uplink acknowledgement, after decoding a header of uplink data, to determine timing alignment information for communications between the AP and the first and the second STAs;
       control the transceiver to establish a first communication with the first STA; and
       control the transceiver to establish a second communication with the second STA based on the joint transmission information.

16. The AP of claim 15, wherein calculating the joint transmission information comprises:
    calculating interference information associated with the AP and the first and the second STAs;
    calculating the timing alignment information for communications between the AP and the first and the second STAs; and
    calculating efficiency information for the communications between the AP and the first and the second STA.

17. The AP of claim 15, wherein the first communication is an uplink communication from the first STA to the AP, and the second communication is a downlink communication from the AP to the second STA.

18. The AP of claim 15, wherein establishing the second communication comprises:
    delaying reception of an acknowledgement by the AP from the second STA until after an acknowledgment from the AP is received by the first STA.

19. The AP of claim 15, wherein the establishing the second communication comprises:
    transmitting, by the transceiver, a first protocol data unit (PDU) comprising an acknowledge policy set to block acknowledgment; and
    transmitting, by the transceiver, a block acknowledgment request (BAR) to the second STA to delay reception of an acknowledgement from the second STA by the AP until after an acknowledgment from the AP is received by the first STA.

20. The AP of claim 15, wherein establishing the second communication comprises:
    transmitting, by the transceiver, a first protocol data unit (PDU) comprising an acknowledge policy set to block acknowledgment; and
    transmitting, by the AP, a second PDU comprising an acknowledgment policy set to a normal acknowledgment to delay an acknowledgement from the second STA to the AP until after an acknowledgment from the AP is received by the first STA.

21. The AP of claim 15, wherein establishing the second communication comprises:
    decoding a first protocol data unit (PDU) received by the AP from the first STA; and
    establishing the second communication based on the decoded first PDU.

22. The AP of claim 15, wherein establishing the second communication comprises:
    padding a data block of the second communication with one or more dummy bits to delay reception of an acknowledgement from the second STA by the AP until after transmission of an acknowledgment from the AP to the first STA has been initiated by the AP.

23. The AP of claim 15, wherein establishing the second communication comprises:

transmitting a clear-to-send (CTS) packet to the first STA in response to a request-to-send (RTS) packet from the first STA to initiate a transmission of a data block by the transceiver to the second STA before reception of a data block from the first STA to the AP.

24. The AP of claim 23, wherein establishing the second communication further comprises: transmitting, by the transceiver, a block acknowledgment request (BAR) to the second STA to delay reception of an acknowledgement from the second STA by the AP until after an acknowledgment from the AP is received by the first STA; or padding the data block of the second communication with one or more dummy bits to delay the reception of the acknowledgement from the second STA by the AP until after transmission of the acknowledgment from the AP to the first STA has been initiated, wherein the acknowledgment from the second STA acknowledges reception of the data block of the second communication by the second STA and the acknowledgment from the AP acknowledges reception of the data block of the first communication from the first STA by the AP.

25. A communication method to communicate between an access point (AP) and first and second communication stations (STAs), comprising:

calculating joint transmission information based on the first and the second STAs, the joint transmission information comprising:
- interference information associated with the AP and the first and the second STAs;
- timing alignment information for communications between the AP and the first and the second STAs, the timing alignment information being determined based on an estimation of a start time of an uplink acknowledgement after decoding a header of uplink data; and
- efficiency information for the communications between the AP and the first and the second STA;

establishing an uplink communication between the AP and the first STA; and establishing a downlink communication between the AP and the second STA jointly with the uplink communication between the AP and the first STA based on the joint transmission information.

26. The communication method of claim 25, wherein establishing the downlink communication comprises: delaying reception of an acknowledgement from the second STA by the AP until after an acknowledgment from the AP is received by the first STA.

\* \* \* \* \*